United States Patent
Ikeda

(10) Patent No.: US 6,346,011 B1
(45) Date of Patent: *Feb. 12, 2002

(54) BATTERY-CONNECTING PLATE, METHOD OF PRODUCING SAME AND WIRE PROTECTOR

(75) Inventor: Tomohiro Ikeda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/413,242

(22) Filed: Oct. 7, 1999

(30) Foreign Application Priority Data

Oct. 9, 1998 (JP) .......................................... 10-287904

(51) Int. Cl.⁷ .............................................. H01R 33/00
(52) U.S. Cl. ..................... 439/627; 439/500; 439/722
(58) Field of Search ................................. 439/627, 500, 439/722, 733.1

(56) References Cited

U.S. PATENT DOCUMENTS

| | | | |
|---|---|---|---|
| 1,215,004 A | 2/1917 | Decker | 429/158 |
| 2,995,614 A | 8/1961 | Krueger | 429/158 |
| 3,339,169 A | 8/1967 | Freeland | 439/55 |
| 4,842,534 A | 6/1989 | Mobley et al. | 439/214 |
| 4,920,019 A | 4/1990 | Stoklosa et al. | 429/122 |
| 5,378,552 A | 1/1995 | Dixon, Jr. | 429/91 |
| 5,447,808 A | 9/1995 | Molyneux | 429/158 |
| 5,466,974 A | 11/1995 | Sutrina et al. | 307/38 |
| 5,496,657 A | 3/1996 | Dixon, Jr. | 429/62 |
| 5,538,434 A | 7/1996 | DelGuidice et al. | 439/181 |
| 5,643,693 A * | 7/1997 | Hill et al. | 439/121 |
| 5,645,448 A | 7/1997 | Hill | 439/522 |
| 5,662,497 A | 9/1997 | Reilly | 439/627 |
| 5,795,193 A | 8/1998 | Yang | 439/621 |
| 5,886,611 A | 3/1999 | Schaller et al. | 337/189 |
| 5,928,020 A | 7/1999 | Bishop, Jr. et al. | 429/188 |
| 5,948,559 A | 9/1999 | Snyder | 560/51 |
| 6,010,375 A | 1/2000 | Higuchi | 439/763 |
| 6,146,788 A * | 11/2000 | Ikeda et al. | 429/160 |
| 6,152,776 A * | 11/2000 | Ikeda et al. | 439/627 |
| 6,168,470 B1 * | 1/2001 | Ikeda et al. | 439/621 |
| 6,261,719 B1 | 7/2001 | Ikeda et al. | 429/211 |

FOREIGN PATENT DOCUMENTS

| | | |
|---|---|---|
| DE | 515051 | 1/1931 |
| EP | 892 450 A2 | 1/1999 |
| JP | 11-120986 | 4/1999 |
| JP | 11-120987 | 4/1999 |
| JP | 11-120988 | 4/1999 |

* cited by examiner

*Primary Examiner*—P. Austin Bradley
*Assistant Examiner*—Ann McCamey
(74) *Attorney, Agent, or Firm*—Armstrong, Westerman, Hattori, McLeland & Naughton, LLP

(57) ABSTRACT

A battery-connecting plate consists of busbars for connecting batteries together and a wire protector which holds in a predetermined layout therein terminals and their connection wires for detecting voltage of desired ones of the batteries. The busbars and the wire protector are fixed in a resin plate by insert molding, with the busbars arranged in correspondence with the batteries and with the terminals held in contact with related ones of the busbars. The busbars, the voltage detecting terminals and others are integrally incorporated in the connecting plate so that these components are less exposed to the outside. The connecting plate is thus safe and easy to mount.

3 Claims, 22 Drawing Sheets

FIG. 3A
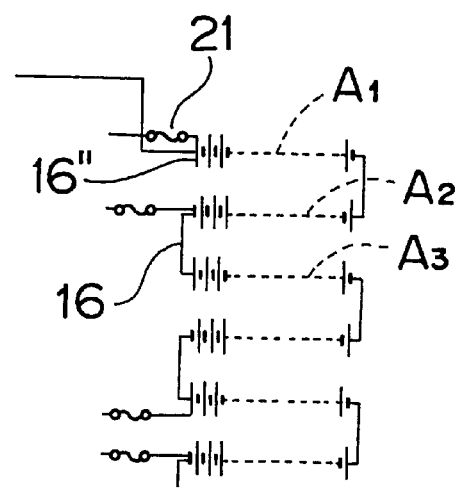
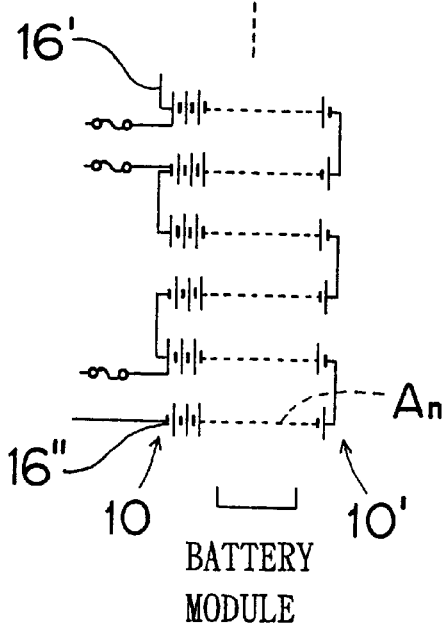
BATTERY MODULE
FIG. 3B
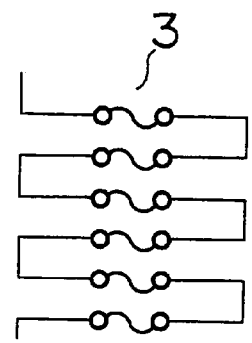
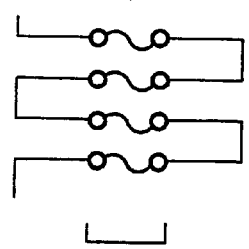
BATTERY MODULE
($A_1 \sim A_n$)

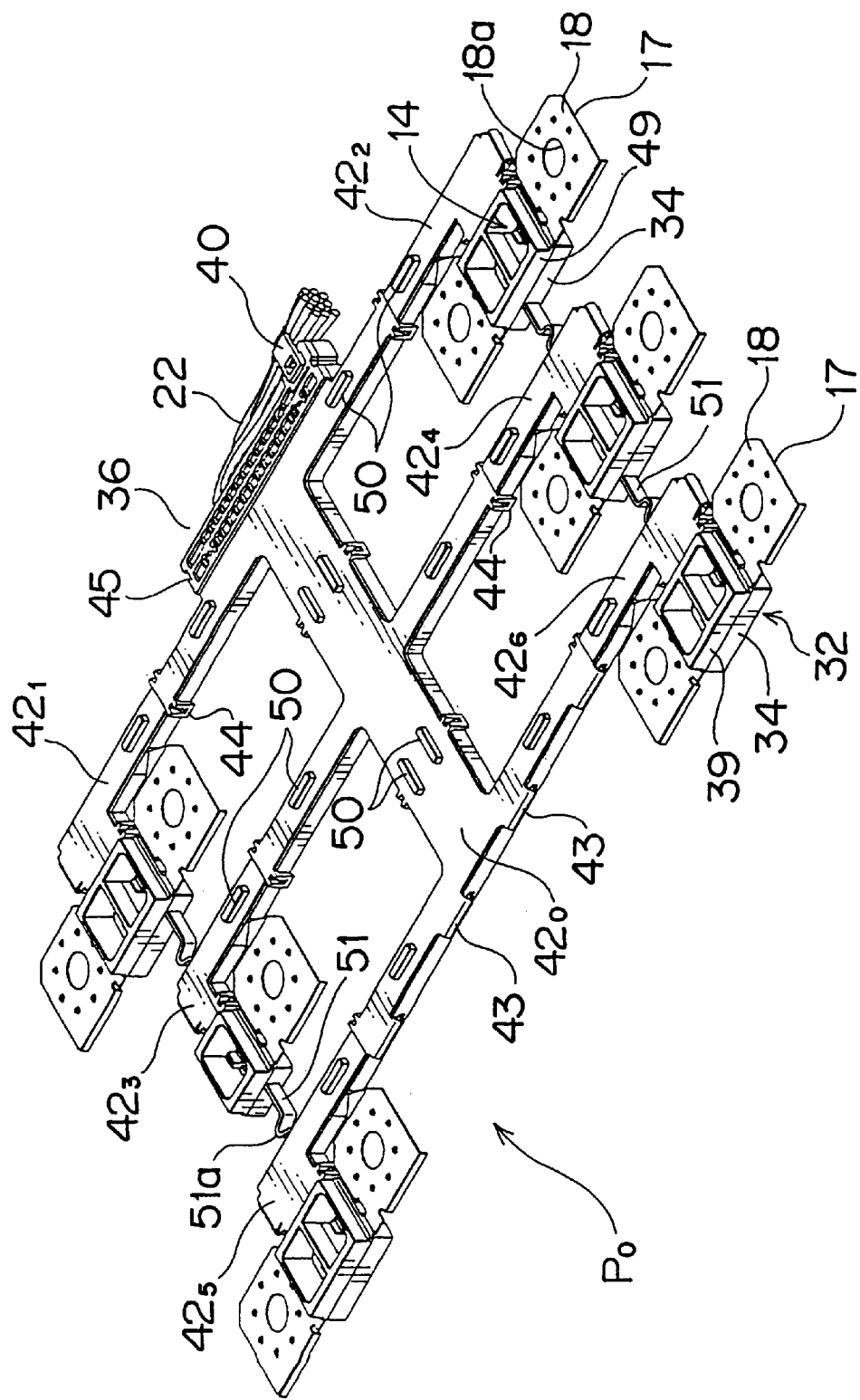

BATTERY-CONNECTING PLATE, METHOD OF PRODUCING SAME AND WIRE PROTECTOR

BACKGROUND OF THE INVENTION

1. Field of the Invention

This invention relates to a battery-connecting plate for use with a battery holder which receives a large number of cylindrical batteries and which is mounted as in an electric vehicle, a method of producing same, and a wire protector.

2. Description of the Related Art

A battery-connecting plate 100 as shown in FIGS. 18A, 18B is conventionally used as a means of connecting a plurality of batteries in series or in parallel.

The connecting plate 100 includes a molded resin plate 103, a busbar 102 for connecting two batteries 101, fixed in the resin plate 103 by molding, the two batteries having nut-type positive and negative electrodes 101a, 101b, and a hexagonal and a square windows 103a, 103b in which electrode-connecting busbar holes 102a are exposed. The connection of the two batteries 101 is effected by fastening the busbar 102 to the nut-type positive and negative electrodes 101a, 101b with the bolts 104, at which time at the hexagonal window 103a a round terminal 105, which constitutes part of a voltage detecting circuit, is concurrently connected. In other words, the wire 106 connected to the round terminal 105 has a fuse 108 interposed in series therein and extends therefrom to a not-shown ECU. The fuse 108, which is enclosed in a fuse casing 107, is connected at its opposite ends, via a female terminal 109, to the wire 106.

FIG. 19 shows another example of a conventional connecting plate.

The connecting plate 100' includes a molded resin plate 103 and a plurality of L-shaped busbars 102' fixed in the resin plate 103 by molding, the L-shaped busbars having connection legs 102b' of different lengths which have one end projected at one side of the molded resin plate 103. A wire 106 is welded at one end to the thus projected end of each L-shaped busbar and extends, via a fuse 108' enclosed in a fuse casing 107', to a not-shown ECU.

The fuse casing 107' includes a base plate 110 and a pair of opposed L-shaped pressure-welding terminals 111 provided on the base plate, the pair of terminals 111 each having a base plate 111a whereat the wire 106 is welded and a pressure-welding piece 111b with a slot 111c rising from the base plate 111a, and the fuse 108 having its leads 108a' pressure-welded via the slots 111c to the respective pressure-welding pieces 111b.

The connecting plate 100 of FIG. 18 requires many connections in one circuit, for example, six connections in the voltage detecting circuit as shown at characters a, b . . . f, and also requires a large components count, possibly resulting in reliability in electric connection lowered. Further, the wired round terminals 105 require a manual operation one by one during their bolting, and hence as the number of wires 106 increases, it will become troublesome to bolt the round terminals 105 and to lay their wires 106.

On the other hand, the connecting plate 100' of FIG. 19 requires L-shaped busbars 102' of different sizes, and hence is disadvantageous in the production cost of the L-shaped busbars and their administration. Further, as is the case of the connecting plate 100, there are required a large components count and a large connections count in one circuit (five connections of a', b' . . . e'), and besides difficulty is encountered in protecting the welds between the wires 106 and their corresponding connection legs 102b'.

Further, the connection wires 106 of the connecting plates 100, 100', being directly connected to the related batteries 101, need to be properly protected. Due to the bulky member of the fuse casing 107, 107' interposed, however, such a protection structure will inevitably become complicated.

FIG. 20 shows the case in which batteries are connected together not with a connecting plate, but directly with wires. In other words, each prism-shaped battery 101' has positive and negative electrodes 101a', 101b' juxtaposed at one end, a main power wire 112 is used to connect neighboring batteries to each other, and wires 106 each with a fuse casing 107 (voltage detecting circuits), as in the case of FIG. 18, are connected to predetermined electrodes 101b'.

Also in this case, a large components count is required. Further, the wires are dangerously exposed at many portions. In addition, due to the intersecting main power wires 112 and voltage detecting circuit constituting wires 106, the wiring becomes complicated so as to cause an improper wiring.

Under these conditions, it is conceived to embed the connection wires 106 of the connecting plate 100, 100' in the molded resin plate 103 by insert molding.

With a conventional method of insert molding, however, as shown in FIGS. 21A, 21B, the wires 113, although firmly fixed inside the molded resin plate 114, become free outside the plate. Consequently, concentration of stress tends to take place at the roots 113a of the wires 113 located at the edge of the molded resin plate 114, so that in extreme cases the wires 113 are cut at the roots 113a by the action of a minimal external force. To prevent this, it is conceived to bundle the wires 113 with a band 115 or to fix the wires to a wall of the molded resin plate 114 through a fixture. The concentration of stress at the roots 113a, however, cannot be fully precluded, because the above operation is effected only after completion of the insert molding.

Further, there remains another cause of the cutting of the wires 113 at the roots 113a, which is the biting by the upper and lower dies 116 at the outlet of the wires.

Further, with a conventional method of insert molding, because, as shown in FIG. 22, the molten resin injected from the nozzle 119 of a molding machine into the mold 116 has a temperature higher than the heat-resisting temperature of the insulating cover 113b of commonly used wires 113, it has been required to use heat-resistant wires covered as with polyimide, resulting in a cost increase.

SUMMARY OF THE INVENTION

This invention has been accomplished to overcome the above drawbacks and an object of this invention is to provide a battery-connecting plate which has integrally incorporated therein by insert molding battery-connecting busbars, voltage-detecting-circuit-constituting terminals and others, so that these components are less exposed to the outside, and is safe and easy to mount, and to provide a method of producing such battery-connecting plate.

Another object of this invention is to provide a battery-connecting plate which has a low parts count and low connections count, is highly reliable in electric connection, and does not cause improper connection and improper wiring to batteries.

Yet another object of this invention is to provide a battery-connecting plate which does not cause concentration of stress at that part of connection wires whereat the connection wires extend out of the molded resin plate.

Yet another object of this invention is to provide a method of producing a connecting plate according to which a commonly used wire covered with polyvinyl chloride or polyethylene can be used in place of a special heat-resistant wire such as polyimide-covered wire and which can thus be produced at a low cost.

A further object of this invention is to provide a wire protector which enables the production of the connecting plate as mentioned above.

In order to attain the objects, according to an aspect of this invention, there is provided a battery-connecting plate which comprises: busbars for connecting batteries together; and a wire protector which holds in a predetermined layout therein terminals and their connection wires for detecting voltage of desired ones of the batteries, the busbars and the wire protector being fixed in a resin plate by insert molding, with the busbars arranged in correspondence with the batteries and with the terminals held in contact with related ones of the busbars.

Preferably, the terminals each comprises a contact portion superimposed on the respective busbar, a wire connecting portion at which connected to the respective connection wire, and an element mount portion linking the contact portion and the wire connecting portion, and the connecting plate further comprises circuit protector elements which are, after completion of the insert molding, connected to the respective element mount portions of the terminals.

Preferably, the connection wires connected to the respective terminals are let out of the resin plate at one side thereof.

According to another aspect of this invention, there is provided a method of producing the battery-connecting plate as mentioned above, which comprises the steps of: providing busbars which connect batteries together; attaching terminals to one end of wires to produce terminal-attached wires for detecting voltage of desired ones of the batteries, the terminals each having a contact portion, a wire connecting portion at which attached to the respective wire, and an element mount portion linking the contact portion and the wire connecting portion; placing the terminal-attached wires in a predetermined layout in a wire protector, with tail portions of the wires let out at one side of the wire protector; setting the busbars and the wire protector in a mold such that the busbars are in position corresponding to an arrangement of the batteries, and the terminals have their contact portions superimposed on the respective busbars; injecting resin into the mold to produce a molded piece with the busbars and the terminal-attached wires embedded therein, with the contact portions of the terminals on the respective busbars and the element mount portions of the terminals left uncovered by the resin; and cutting the element mount portion of each of the terminals and connecting a respective circuit protector element to the element mount portion in a bridging manner across the cut.

Preferably, the busbars each has at least one electrode connection hole and the contact portions of the terminals each has a central hole, and wherein the contact portions are superimposed on the respective busbars with their holes aligned to each other.

Preferably, the element mount portions of the terminals each comprises a link piece at which the element mount portion is cut.

According to yet another aspect of this invention, there is provided a wire protector which comprises: a protector body including a trunk receiver for receiving trunk wires and a plurality of branch receivers continuous to the trunk receiver for receiving branch wires from the trunk wires, the plurality of branch receivers each including a terminal holder provided at a free end thereof and an expandable positional deviation absorbing portion arranged at an intermediate length thereof; and an open/close cover including a main cover for covering the protector body from the trunk receiver to the positional deviation absorbing portions of the branch receivers and a plurality of subcovers for covering the respective branch receivers from the terminal holder to the positional deviation absorbing portion, the main cover and the subcovers being rotatably linked via hinges to the protector body at positions corresponding to the trunk receiver and the respective branch receivers.

Preferably, the wire protector further comprises a wire letting-out portion provided at one end of the trunk receiver, the wire letting-out portion having a plurality of wire placement grooves, and a lit provided on the main cover corresponding to the wire letting-out portion.

Preferably, the positional deviation absorbing portion of each of the branch receivers comprises a pair of bent portions formed in a staggered manner in opposed side walls of the branch receiver and stoppers provided projecting in a staggered manner from one to the other of inner surfaces of the bent wall portions.

Preferably, the wire protector further comprises a positioning rib provided on the protector body or the open/close cover for positioning the wire protector in a mold.

The above and other objects, features and advantages of this invention will become apparent from the following description and the appended claims, taken in conjunction with the accompanying drawings.

BRIEF DESCRIPTION OF THE DRAWINGS

FIGS. 3A and 3B are connection diagrams obtained when batteries are connected in series by the connecting plates of FIG. 1, of which FIG. 3A shows a battery voltage detecting circuit and FIG. 3B shows a battery temperature detecting circuit;

FIG. 7 is a perspective view of a harness consisting of the wire protector of FIG. 6, and voltage detecting terminals and their connection wires held in the wire protector;

DESCRIPTION OF THE PREFERRED EMBODIMENTS

Embodiments of this invention will now be described with reference to the attached drawings.

Figure 1:
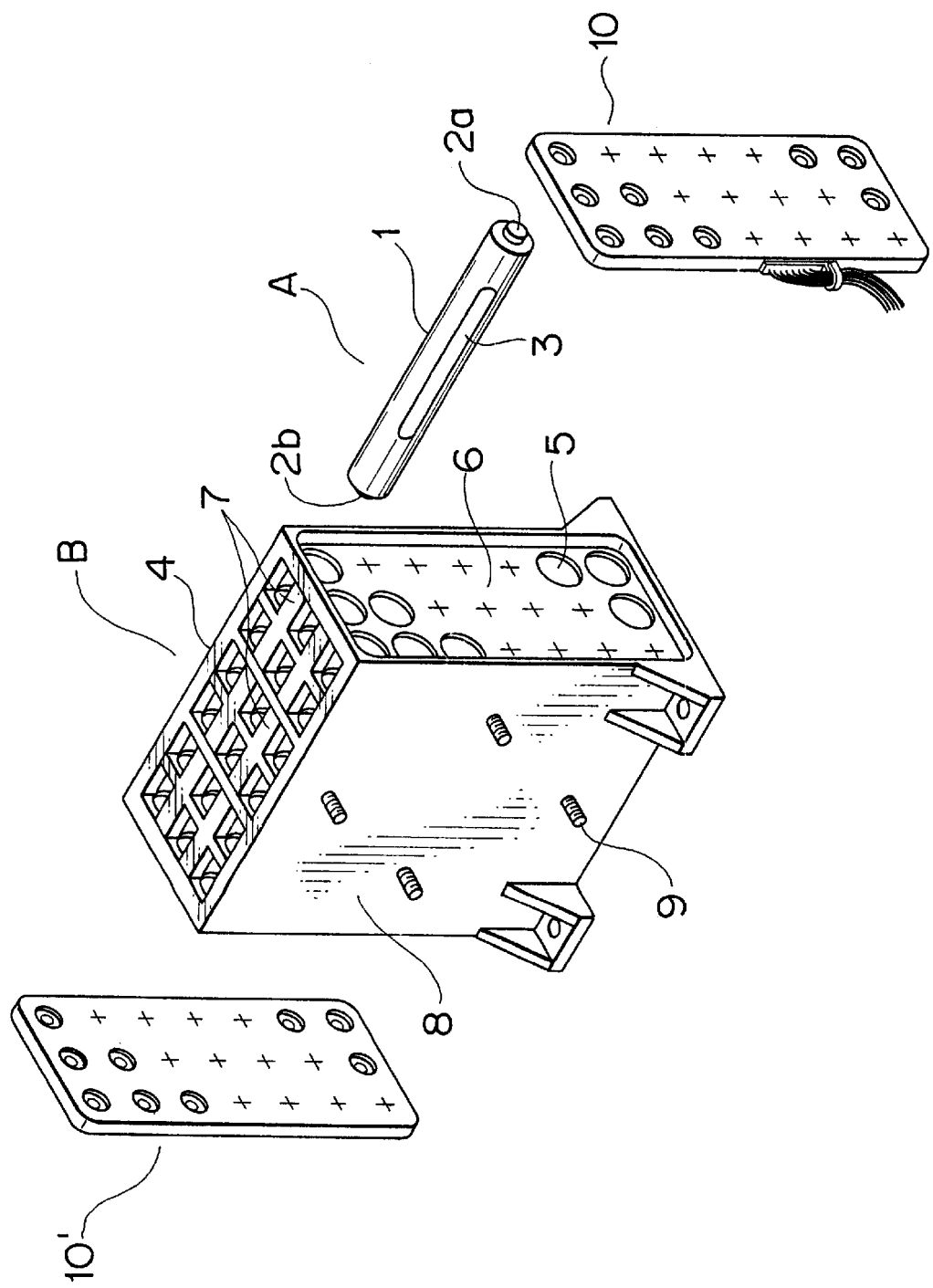
FIG. 1 is a perspective view of a battery holder provided with battery connecting plates according to one embodiment of this invention.

In FIG. 1, denoted A is a long cylindrical battery used as in an electric vehicle and B is a battery holder for receipt therein of a plurality of the batteries A. The battery A includes a main body 1, female-thread nut type positive and negative electrodes 2a, 2b provided at opposite ends of the main body 1, and a PTC element 3 secured to the outer periphery of the main body for checking the generation of heat from the battery A. The battery holder B consists of a rectangular parallelepiped frame body 4 and connecting plates 10, 10' assembled at opposite sides of the frame body. The frame body 4, in the illustrated example, includes a plurality of support plates 6, each having a total of 21 (7 by 3) battery insertion holes 5, stays 7 which hold the support plates 6 in a parallel arrangement with one another, and major walls 8 one of which is provided with bolts 9 for fastening the frame body 4 to a vehicle body.

Figure 2:
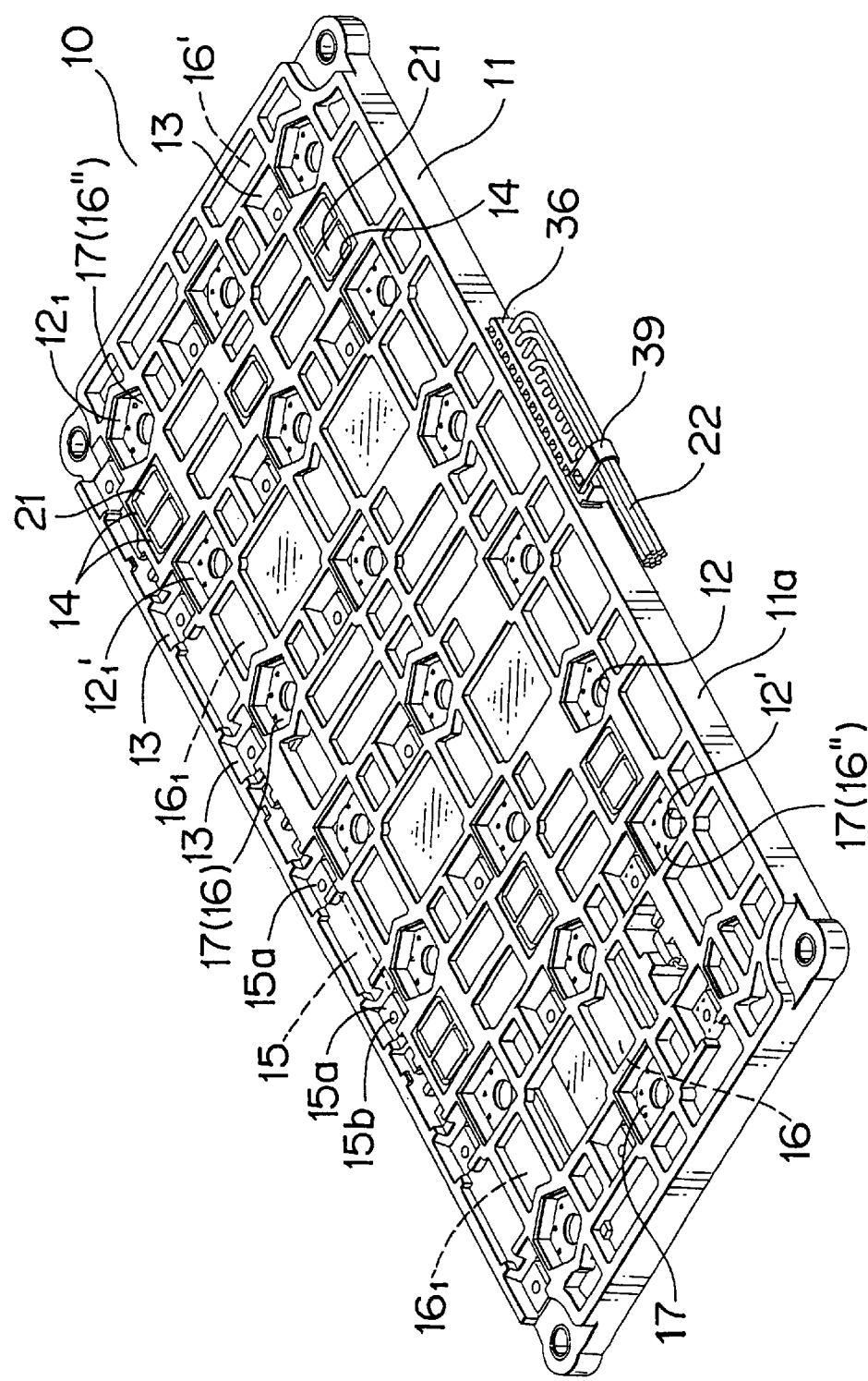
FIG. 2 is a perspective view of one of the connecting plates in FIG. 1.
Figure 4:
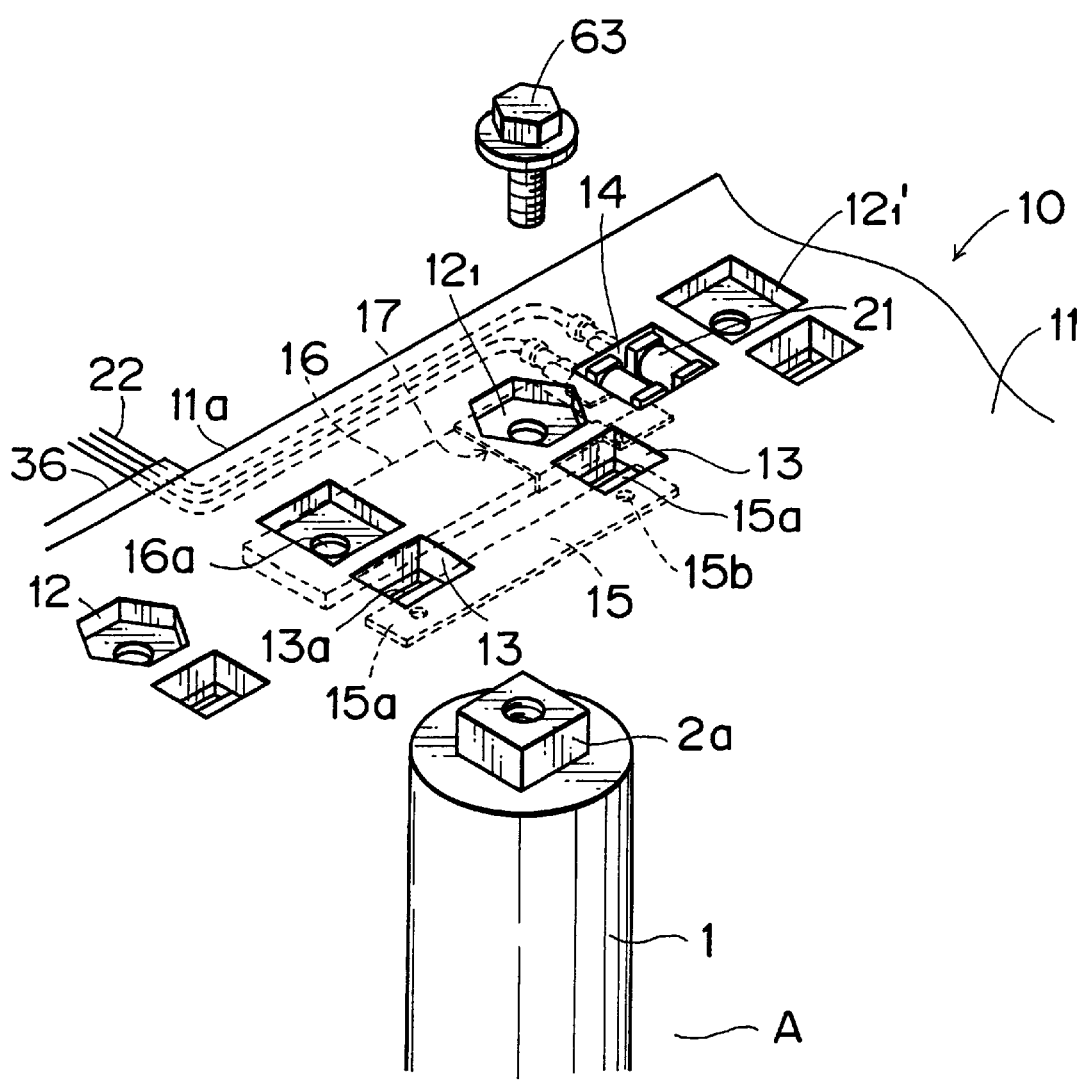
FIG. 4 is an enlarged perspective view of an essential portion of the connecting plate of FIG. 2.
Figure 5:
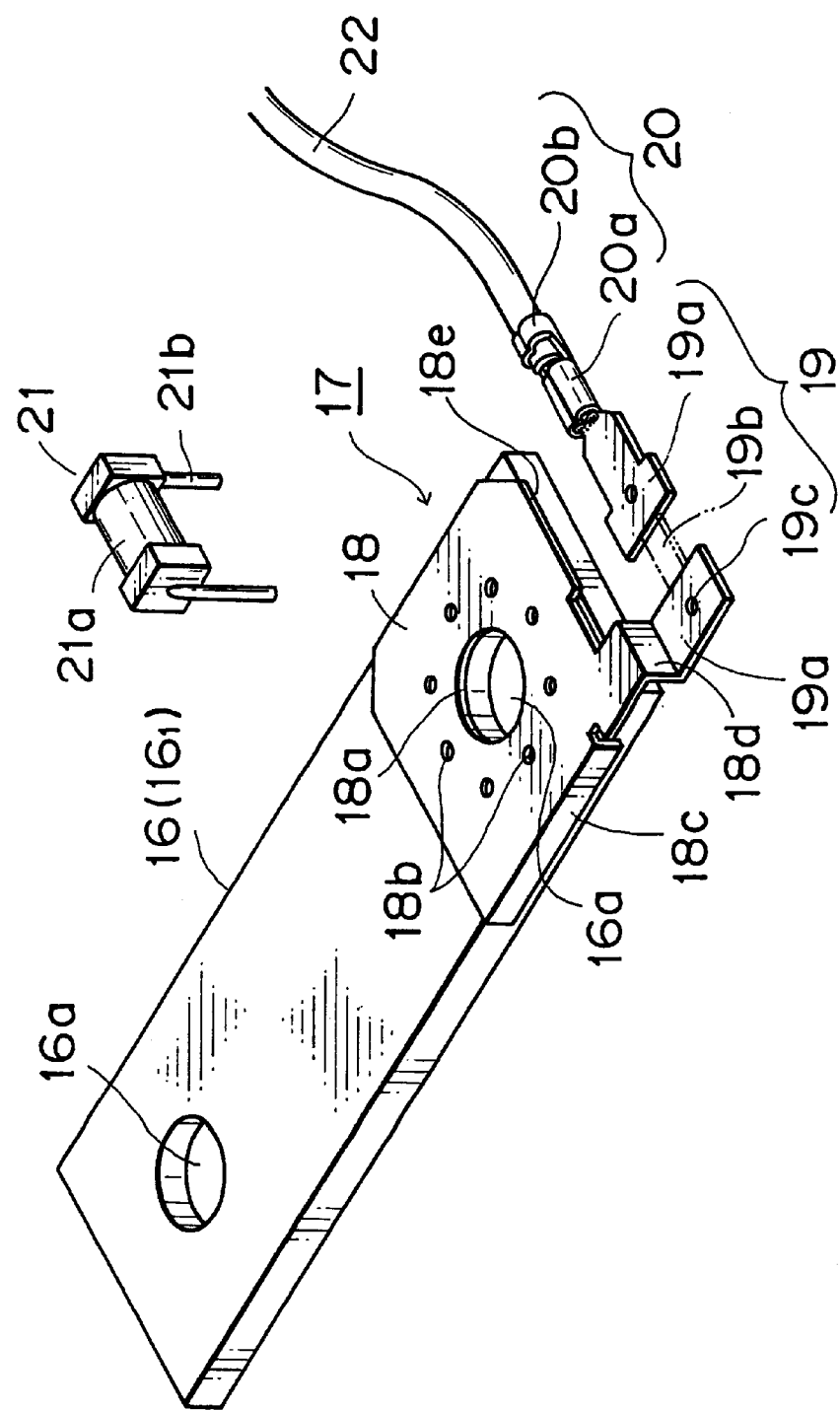
FIG. 5 is an enlarged perspective view of a busbar, voltage detecting terminal and circuit protecting element of FIG. 4, shown in a connected condition.

FIG. 2 is a perspective view of the connecting plate 10, FIGS. 3A and 3B are connection diagrams of the batteries A connected in series with the connecting plates 10, 10' and show a battery voltage detection circuit and a battery temperature detection circuit, respectively. FIG. 4 is an essential portion enlarged view of the connecting plate 10, and FIG. 5 is a perspective view of a busbar, a voltage detecting terminal and a circuit protecting element in FIG. 4 in a connected condition.

The connecting plate 10 includes a molded resin plate 11, and a plurality of busbars 16, 16' (FIG. 15) for connecting the batteries and a wire protector 23 (FIG. 6), both fixed in the molded resin plate 11 by insert molding, which wire protector holds therein voltage detecting terminals 17 which are connected to the busbars 16, 16' and their connection wires 22.

The molded resin plate 11 has battery-connecting hexagonal windows 12 and square windows 12' arranged in correspondence with the batteries A. A PTC element connecting square window 13 is juxtaposed to each window 12, 12'. Two fuse mount windows 14 are juxtaposed between desired ones of the hexagonal windows $12_1$ and of the square windows $12_1'$. Between neighboring square windows 13, 13 are embedded connection pieces 15 which connect the PTC elements 3 in series, in such a manner that their opposite ends 15a, each with a connection hole 15b, are exposed in the related square windows 13. A fuse 21 is received in each fuse mount window 14.

The busbar 16 is provided in ring-shaped plate form for flowing a large current, provided at its opposite ends with electrode connection holes 16a, and has a length corresponding to the spacing between neighboring electrodes A. The busbar 16' is U-shaped to connect the electrodes A in neighboring rows of electrodes.

Of the busbars 16 (16'), for example to those designated at $16_1$ are connected voltage detecting terminals 17.

The voltage detecting terminal 17 includes a contact portion 18 which is superimposed on the busbar 16, and an element mount portion 19 and a wire connecting portion 20 continuous from the contact portion 18 in this order, and is integrally stamped out of an electrically conductive metallic plate, followed by bending.

The contact portion 18 is provided in a square or rectangular plate form of such size as to be superimposed on an end of the busbar 16, and has a center bolt insertion hole 18a of the same diameter as the electrode connection hole 16a and a plurality of small diameter resin leakage checking holes 18b (eight in the illustrated example) surrounding the hole 18a. The contact portion 18 has a resin leakage prevention piece 18c bent at one side thereof, and a continuous piece 18d bent downwardly at the side perpendicular to the side where the prevention piece 18c is provided, via which the element mount portion 19 is continuous to the contact portion 18.

By abutting the resin leakage prevention piece 18c and the continuous piece 18d against respective edges at the end of the busbar 16, the electrode connection hole 16a and the bolt insertion hole 18a have their centers aligned with each other. The edge 18e at the continuous piece 18d side of the contact piece 18 steps back to be located slightly rearwardly as compared with the continuous piece 18d.

The element mount portion 19 includes a pair of lead connection pieces 19a, 19a and a link piece 19b which integrally links the lead connection pieces. The fuse 21 includes a fuse body 21a and leads 21b extending at opposite ends of the fuse body. Each lead connection piece 19a has a lead connection hole 19c for receiving the respective lead 21b of the fuse 21. The element mount portion 19 is as a whole located at a one-step lower level than the contact portion 18 through the continuous piece 18d and one lead connection piece 19a, and extends parallel to the end surface of the busbar 16. The other lead connection piece 19a has a wire connection portion 20 with a wire barrel 20a and an insulator barrel 20b to which a covered wire 22 is at one end connected through crimping of the barrels 20a, 20b. The wire 22 is wired at the other end side to a wire letting-out portion 36 at one side edge 11a of the molded resin plate 11, at which the wires 22 are held at a predetermined spacing and let out of the molded resin plate 11.

The element mount portion 19, i.e., the pair of lead connection pieces 19a, 19a and their linking piece 19b, as shown in FIG. 16, are exposed in the fuse mount window 14 of the resin plate 11.

The link piece 19b of the element mount portion 19, after molding the resin plate 11 by insert molding, is cut and removed through the fuse mount window 14, and the leads 21b of the fuse 21 are inserted into the lead connection holes 19c of the respective lead connection pieces 19a, followed by their soldering to the lead connection pieces to connect the fuse 21 to the voltage detecting terminal 17.

Figure 6:
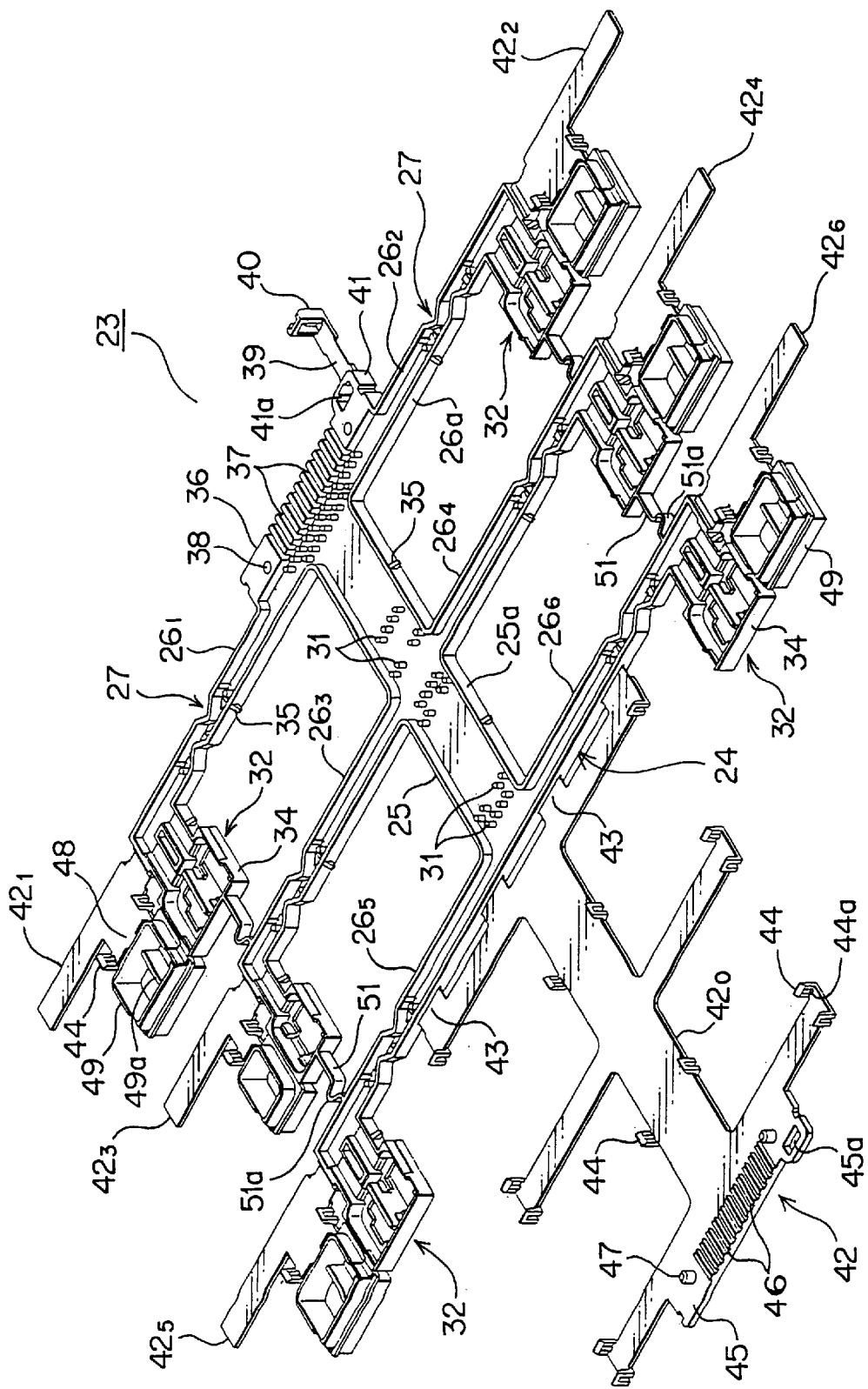
FIG. 6 is a perspective view of a wire protector shown in an opened condition, which constitutes the battery-connecting plate of FIG. 1.

The insert molding here is effected, apart from the busbars 16, 16', with the voltage detecting terminals 17 and their connection wires 22, as shown in FIGS. 6 and 7, held in advance in a predetermined layout in a wire protector 23.

The wire protector 23 includes a protector body 24 and an open/close cover 42, both made of synthetic resin.

The protector body 24 includes a trunk receiver 25 provided in wide U-shaped form for receiving a large number of trunk wires and a plurality of branch receivers 26 extending from the trunk receiver 25 and provided in narrow U-shaped form. In the illustrated example, there are provided a total of six branch receivers $26_1$, $26_2$ ... $26_6$ which intersect the trunk receiver 25 at right angles in T-shaped form at longitudinally opposite ends and an intermediate portion of the trunk receiver 25. The cover 42 includes a main cover $42_0$ and six subcovers $42_1$, $42_2$ ... $42_6$ for the trunk receiver 25 and for the branch receivers 26.

Each branch receiver 26 has a positional deviation absorbing portion 27 at its intermediate length and a terminal holder 32 at its free end.

Figure 8A:
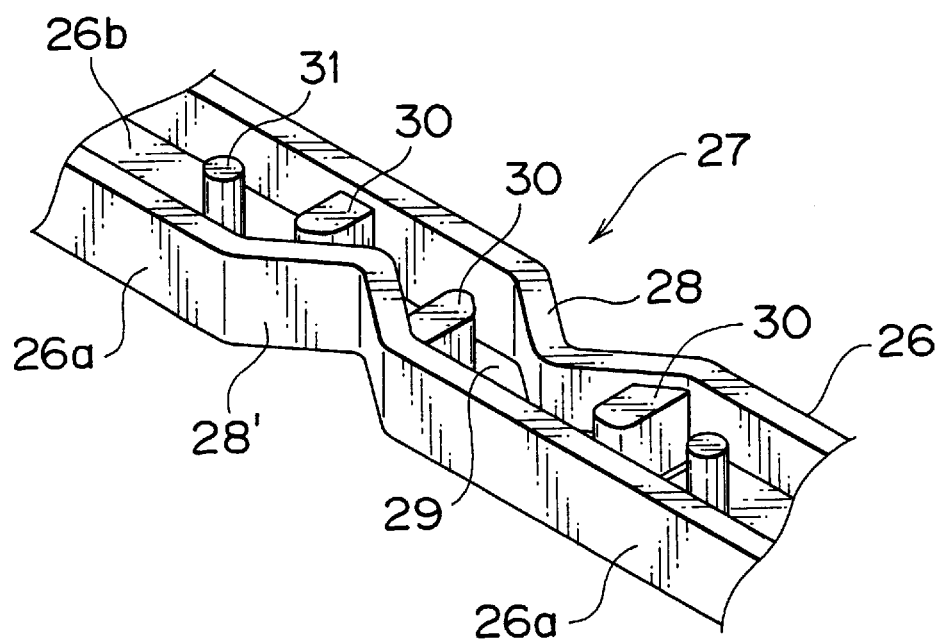
FIG. 8A is a perspective view of a positional deviation absorbing portion of the wire protector of FIG. 6.
Figure 8B:
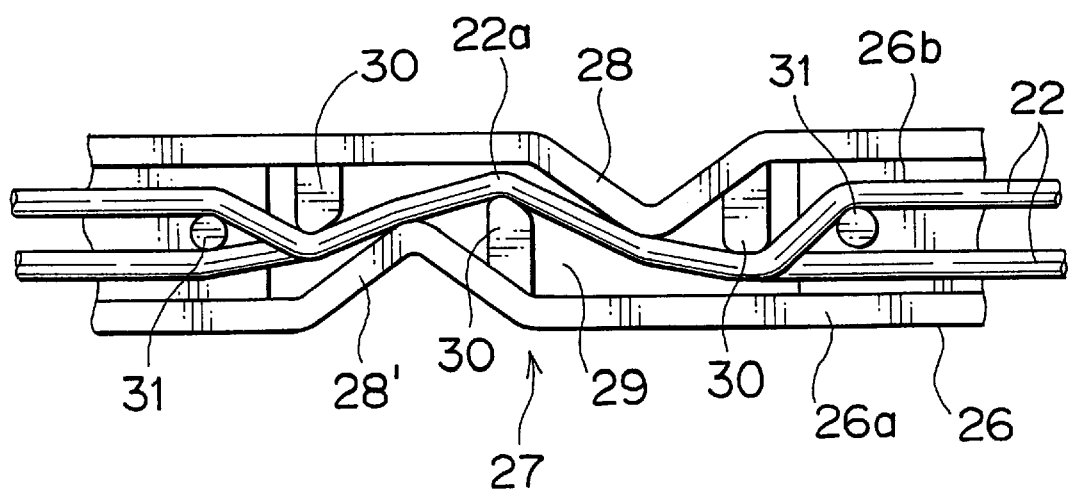
FIG. 8B is a plan view of the absorbing portion of FIG. 8A, shown with a wire laid therethrough.

The positional deviation absorbing portion 27, as shown in FIGS. 8A and 8B, includes V-shaped (or U-shaped) bent portions 28, 28' formed in a staggered manner in opposed side walls 26a at an intermediate length of the branch receiver 26 and a cutout 29 formed in the bottom wall 26b between the bent portions 28, 28', so as to enable expansion and contraction to some degree. Further, there are provided three wire stoppers 30 which extend in a staggered manner from one to the other of the inner surfaces of the bent portions 28, 28' and two wire separating pins 31 upstanding on the bottom wall 26b, one on each side of the cutout 29.

With such structure, as shown in FIG. 8b, the two wires 22 laid in the branch receiver 26 are separated from each other at both up- and downstream sides of the positional deviation absorbing portion 27 by the respective wire separating pins 31 and wired in the absorbing portion 27 with bent portions 22a formed by the cooperation of the bent portions 28, 28' and the three wire stoppers 30, thereby enabling the two wires 22 to smoothly follow the bending or stretching of the positional deviation absorbing portion 27.

The terminal holders 32 provisionally hold the respective voltage detecting terminals 17 in position for insert molding.

Figure 9:
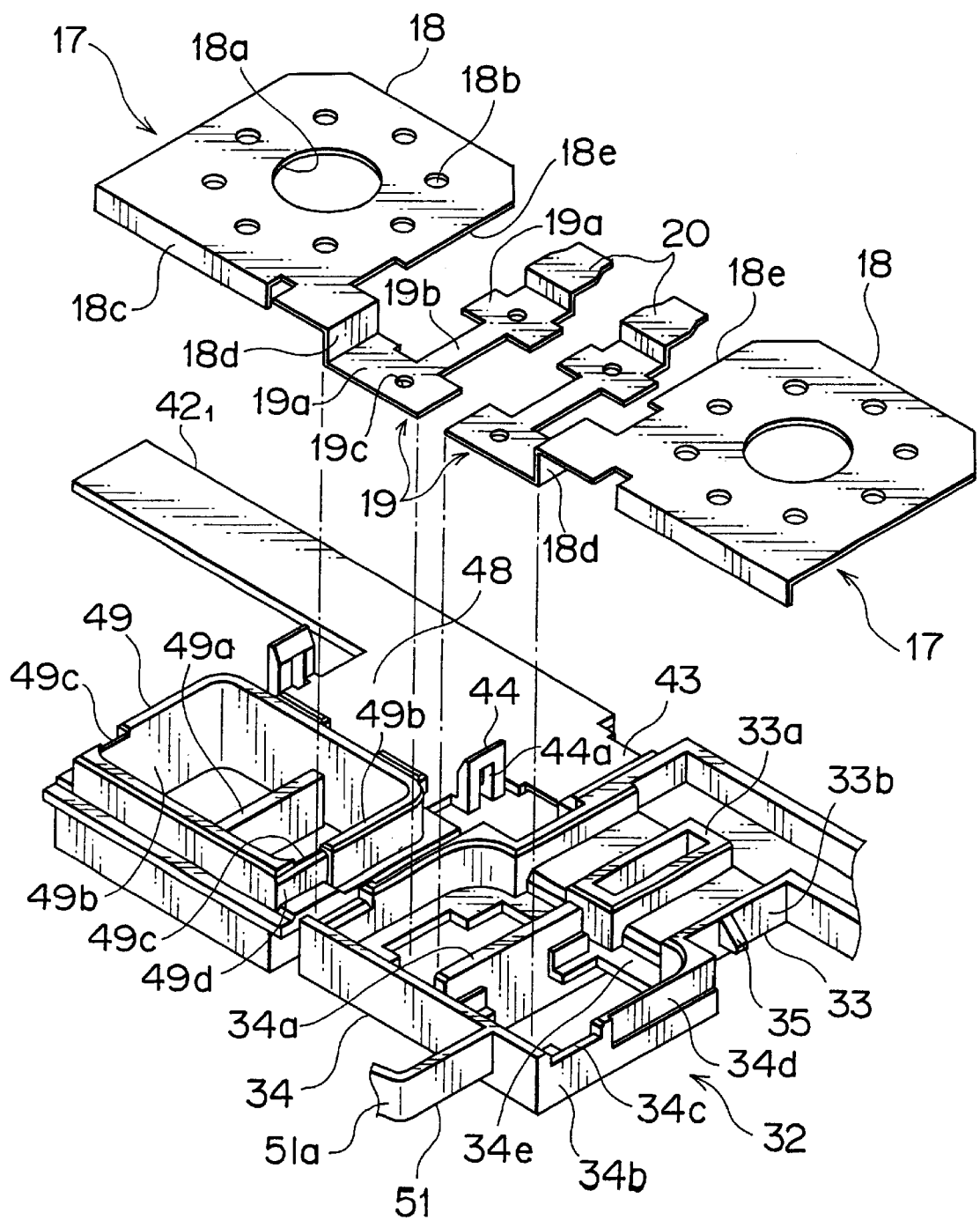
FIG. 9 is a perspective view of a terminal holder of the wire protector of FIG. 6 and voltage detecting terminals, shown in mutual relation.

In other words, the terminal holder 32—which is provided in L-shaped form at the free end of the branch receiver 26 and extends in parallel to the trunk receiver 25—includes, as shown in FIG. 9, two receiver grooves 33 of small width for receiving the wire connection portions 20 of the related voltage detecting terminals 17 and two receiver frames 34 of large width for receiving the related element mount portions 19 of the voltage detecting terminals 17. Opposite side walls 33b at the receiver grooves 33 are provided with lock projections 35.

Opposite side walls 34b at the receiver frames 34 are provided at their forward upper edges with cutouts 34c and on their rearward outer surfaces with recessed portions 34d. Further, receiving seats 34e are provided inside each receiver frame 34.

The downwardly extending continuous piece 18d of the voltage detecting terminal 17 is placed at its base in the cutout 34c so that the element mount portion 19 is disposed on the inside receiving seats 34e, and the side edge 18e, which is indented relative to the continuous piece 18d, adjoins the recessed portion 34d. Following the above, the subcover $42_1$ ($42_2$ ... $42_6$) is closed so that its frame 49 is fitted in the related receiver frames 34 to hold the continuous piece 18d between the side walls 34b, 49b, thereby to provide the fuse mound window 14 FIG. 4).

While in the example of FIG. 9, two receiver grooves 33 and two receiver frames 34 are juxtaposed in one terminal holder 32, divided by respective central partition walls 33a, 34a, it is also possible to provide one receiver groove 33 and receiver frame 34 in one terminal holder 32 as shown at the free end of the branch receiver $26_3$ in FIG. 6.

Figure 11:
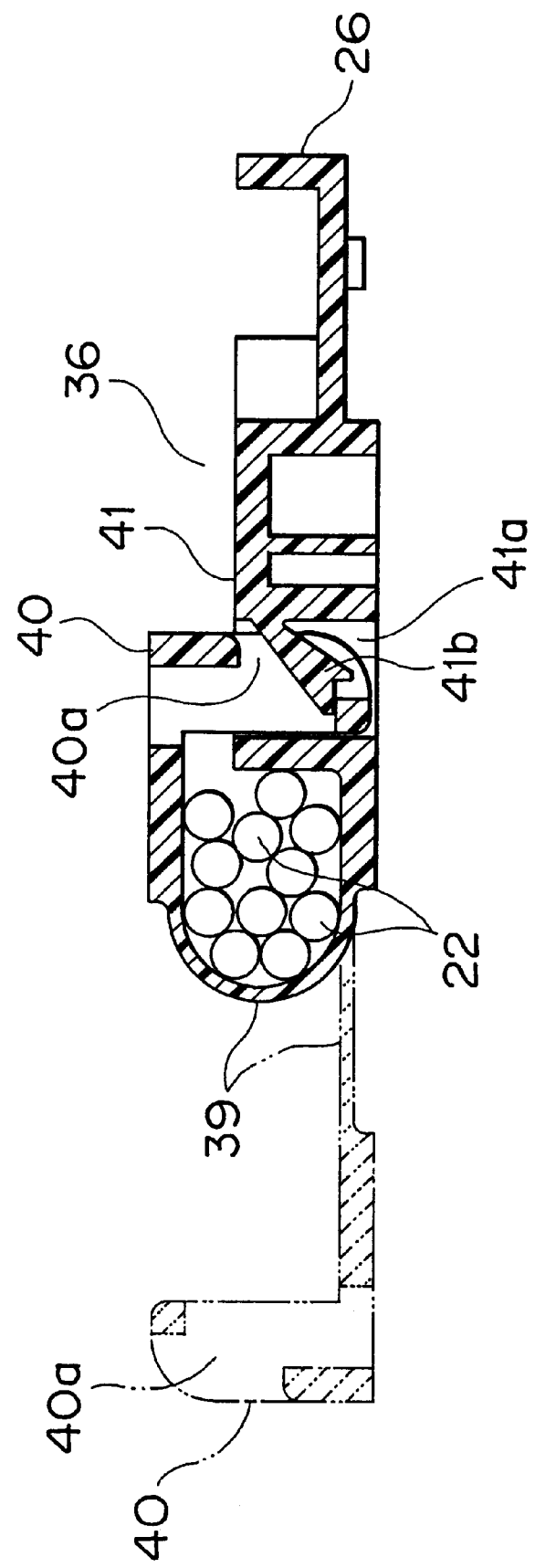
FIG. 11 is a sectional view of a wire letting-out portion of the harness of FIG. 7.

Reverting to FIG. 6, at one end of the trunk receiver 25 of the protector body 24 is provided a wire letting-out portion 36 which is, in the illustrated example, integral with the confluent outer side walls of the branch receivers $26_1$ and $26_2$. The wire letting-out portion 36 includes wire placement grooves 37 at its central upper surface, positioning holes 38 at its left and right sides, and lock means at its one end, the lock means having a wire holding band 39 with a lock piece 40 at its free end and a lock portion 41 with an insertion hole 41a for the lock piece 40. The lock piece 40, as shown in FIG. 11, has a lock hole 40a for locking engagement therein of a resilient lock arm 41b located inside the insertion hole 41a.

The trunk receiver 25 and each branch receiver 26 of the protector body 24 are provided at suitable positions on their opposite side walls 25a, 26a with lock projections 35 as are on the opposite side walls 33b of the receiver grooves 33 (FIG. 9), and a group of wire separating pins 31 are provided inside the trunk receiver 25 at predetermined spacings at the confluence with each branch receiver 26.

The main cover $42_0$ of the cover 42 covers the trunk receiver 25, the wire letting-out portion 36 and each branch receiver 26 up to the positional deviation absorbing portion 27 and is rotatably linked via hinges 43 to the side wall opposite the wire letting-out portion 36, i.e., to the outer confluent side walls of the branch receivers $26_5$, $26_5$. The main cover $42_0$ has resilient lock pieces 44 projecting at positions corresponding to the lock projections 35 of the trunk receiver 25 and each branch receiver 26, the lock pieces 44 each having a lock hole 44a and engageable with the related lock projection 35, and a lid 45 at its free end for the wire letting-out portion 36. The lid 45 has a row of wire holding grooves 46 at its central portion which correspond to the wire placement grooves 37, positioning pins 47 at its opposite sides corresponding to the positioning holes 38 and a hole 45a at its one end corresponding to the insertion hole 41a of the lock portion 41.

The subcover $42_1$ ($42_2$ ... $42_6$) covers the related branch receiver $26_1$ ($26_2$ ... $26_6$) from the terminal holder 32 to the positional deviation absorbing portion 27, includes a lid 48 for the receiver grooves 33 and the frame 49 fittable in the receiver frames 34, and is rotatably linked via a hinge 43 to the terminal holder 32 as is the case with the main cover $42_0$. The lid 48 is provided at its opposite sides with resilient lock pieces 44 engageable with the corresponding lock projections 35. The frame 49, like the receiver frames 34, is divided into two parts by a partition wall 49a, has cutouts 49c on its opposite side walls 49b corresponding to the cutouts 34c, and has those parts of the side walls 49b below the cutouts 49c formed as thin recessed walls 49d.

The main cover $42_0$ and each subcover $42_1$ ($42_2$ ... $42_6$), as shown in FIG. 7, have positioning ribs 50 extending in their respective longitudinal directions on the front surface, which ribs serve to facilitate their positioning in a mold. These ribs 50 may be provided on the underside of the protector body 42.

Incidentally, it is preferred that neighboring terminal holders 32, 32 on the left and right sides of the trunk receiver 25 be linked to each other with an expandable hinge 51 which is provided at the midpoint with a bent portion 51a so that each branch receiver $26_1$–$26_6$ will be prevented from shaking or inclination.

The method of producing the connecting plate 10 by using the wire protector 23 will now be described.

Insulatingly covered wires 22 are first provided which are connected to voltage detecting terminals 17. The wires 22 preferably have their insulating covers marked with different colors, patterns, stripes, signs or the like for the convenience of maintenance purposes and the like. The covered wires 22 are cut to have predetermined lengths and peeled at both ends.

Figure 12:
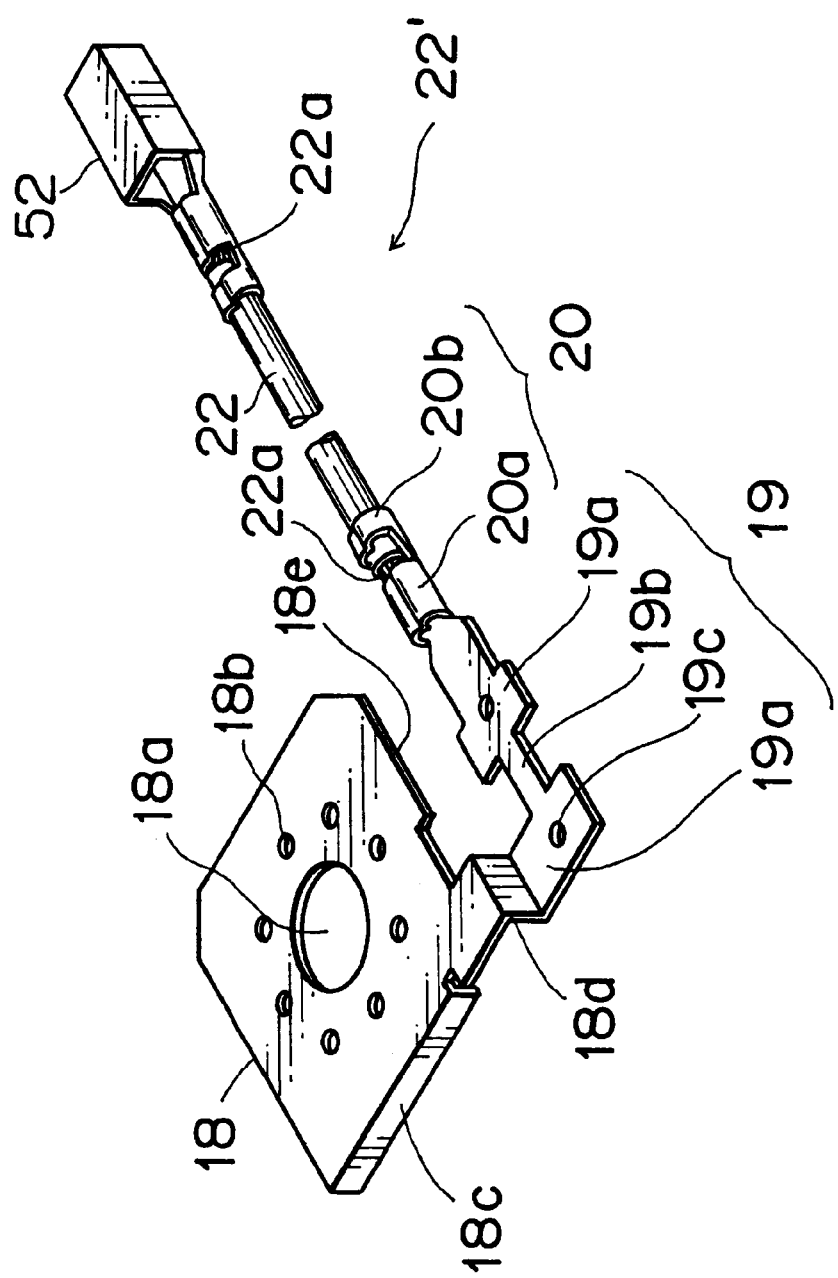
FIG. 12 is an explanatory view of a step for producing the battery-connecting plate of FIG. 1.

The conductor 22a exposed at one end of the wire 22, as shown in FIG. 12, is then connected to the wire connecting portion 20 of the voltage detecting terminal 17, and the conductor 22a exposed at the other end of the wire 22 is connected to a female-type (or male-type) connector terminal 52 to provide a terminal-attached wire 22'.

Figure 13:
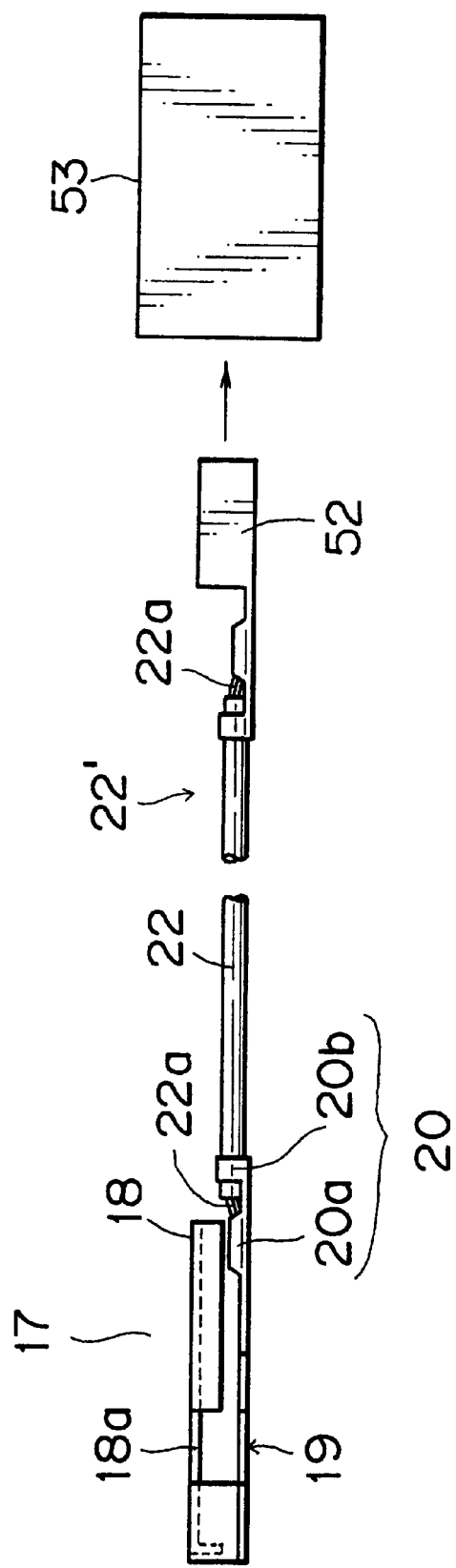
FIG. 13 is an explanatory view of a step subsequent to that of FIG. 12.

The connector terminal 52 of each terminal-attached wire 22', as shown in FIG. 13, is inserted at the final step of manufacturing process into a not-shown terminal receiving cavity of a connector housing 53 to be locked there through a locking means which is known and not shown.

Various terminal-attached wires 22' thus provided are then, as shown in FIG. 6, placed in a predetermined layout on the wire protector 23 in an opened condition.

Figure 10:
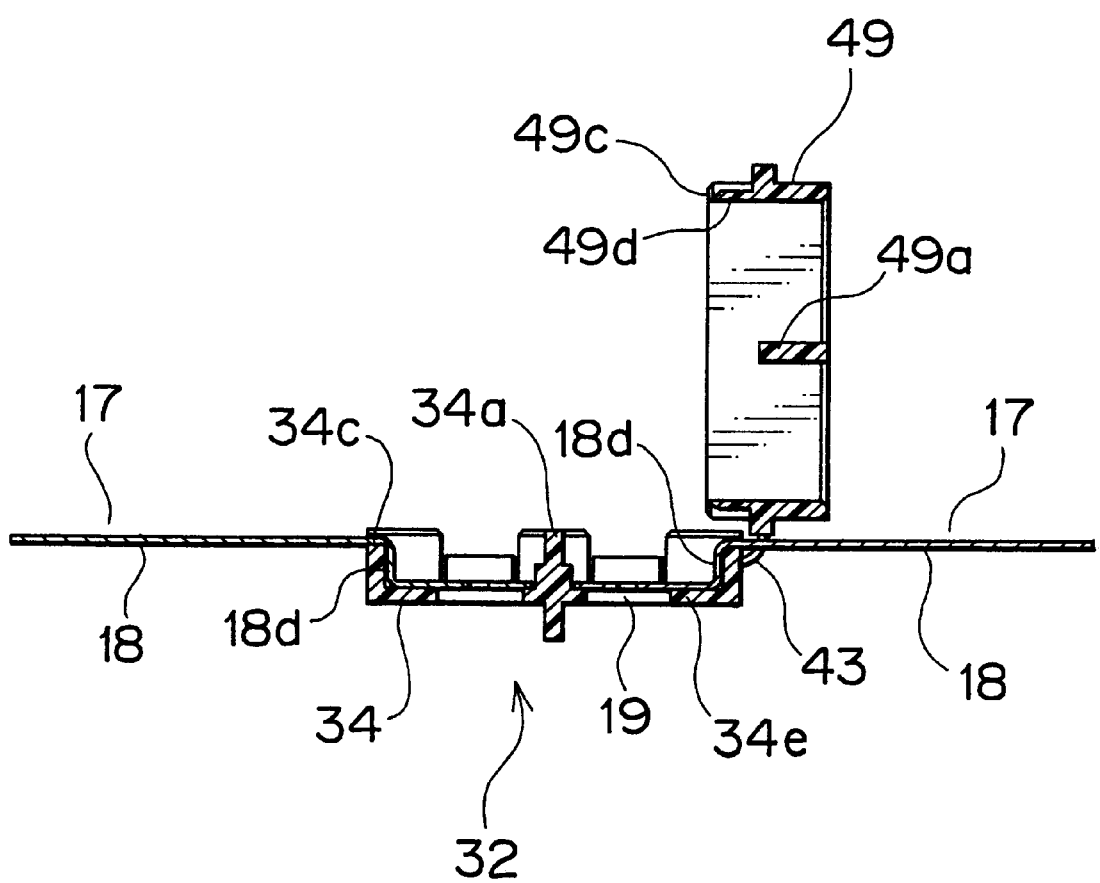
FIG. 10 is a sectional view of the voltage detecting terminals about to be mounted in related receiver frames of the terminal holder of FIG. 9.

More specifically, the wire protector 23 is opened as shown in FIG. 6 and mounted on a not-shown workbench. Then, as shown in FIGS. 9 and 10, at the terminal holder 32, the element mount portion 19 of the voltage detecting terminal 17 is placed on the receiving seats 34e inside the receiver frame 34 located on one side (left side on the drawing of FIG. 10) of the central partition wall 34a, with the wire connecting portion 20 placed on the receiver groove 33. In this instance, the continuous piece 18d of the voltage detecting terminal 17 is fitted at its base in the cutout 34c. The connection wire 22 is provisionally extended up to the positional deviation absorbing portion 27 of the related branch receiver 26.

At the other side (right side on the drawing of FIG. 10) of the central partition wall 34a, the subcover $42_1$ is raised upright relative to the nearby receiver frame 34 through the hinge 43 so as to form a clearance between the receiver frame 34 and the frame 49 of the subcover $42_1$. The voltage detecting terminal 17 can then be placed through the clearance inside the related receiver frame 34 in the same manner as mentioned above.

On closing the subcover $42_1$ under the condition as mentioned above, the frame 49 fits in the receiver frames 34, so that the edge 18e of each contact portion 18 comes into contact with the related recessed portion 34d, and the continuous piece 18d of each voltage detecting terminal 17 is sandwiched between the related side wall 34b and recessed wall 49d, resulting in the terminal holder 32 securely holding the terminal 17 in a horizontally-extended condition. The lock projections 35 engage with the respective resilient lock pieces 44 to lock the subcover $42_1$.

The above procedure is repeated to successively set the terminal-attached wire 22' (voltage detecting terminal 17 and its connection wire 22) in the terminal holder 32 of each branch receiver 26.

Then, as shown in FIG. 8B, the wires 22 are wired through the positional deviation absorbing portion 27 of each branch receiver 26 in a weaving manner between the bent wall portions 28, 28' and wire stoppers 30 to form bent portions 22a. The wires 22 are lightly pulled toward the trunk receiver 25, wired in a manner separated one by one through the wire separating pins 31 located in the trunk receiver 25, and pushed into the respective wire placement grooves 37 of the wire letting-out portion 36 to provisionally hold the wires.

After completion of wiring each wire 22 in the branch receiver 26 and the trunk receiver 25, the main cover $42_0$ is closed, so that the positioning pins 47 of the lid 45 fit in the positioning holes 38 of the wire letting-out portion 36, the resilient lock pieces 44 lockingly engage with the corresponding lock projections 35 of the protector body 25, and the placement grooves 37 and the wire holding grooves 46 cooperate with each other to securely fix each wire 22. The wires 22 let out through the wire letting-out portion 36, as shown in FIG. 11, are bundled with the wire holding band 39, followed by lockingly engaging its lock piece 40 into the insertion hole 41a of the lock portion 41.

Thus, as shown in FIG. 7, voltage detecting terminals 17, which are connected to the busbars 16, and their connection wires 22 are held in a predetermined layout in the wire protector 23 to provide a harness $P_0$ for the connecting plate 10, 10'.

Figure 14:
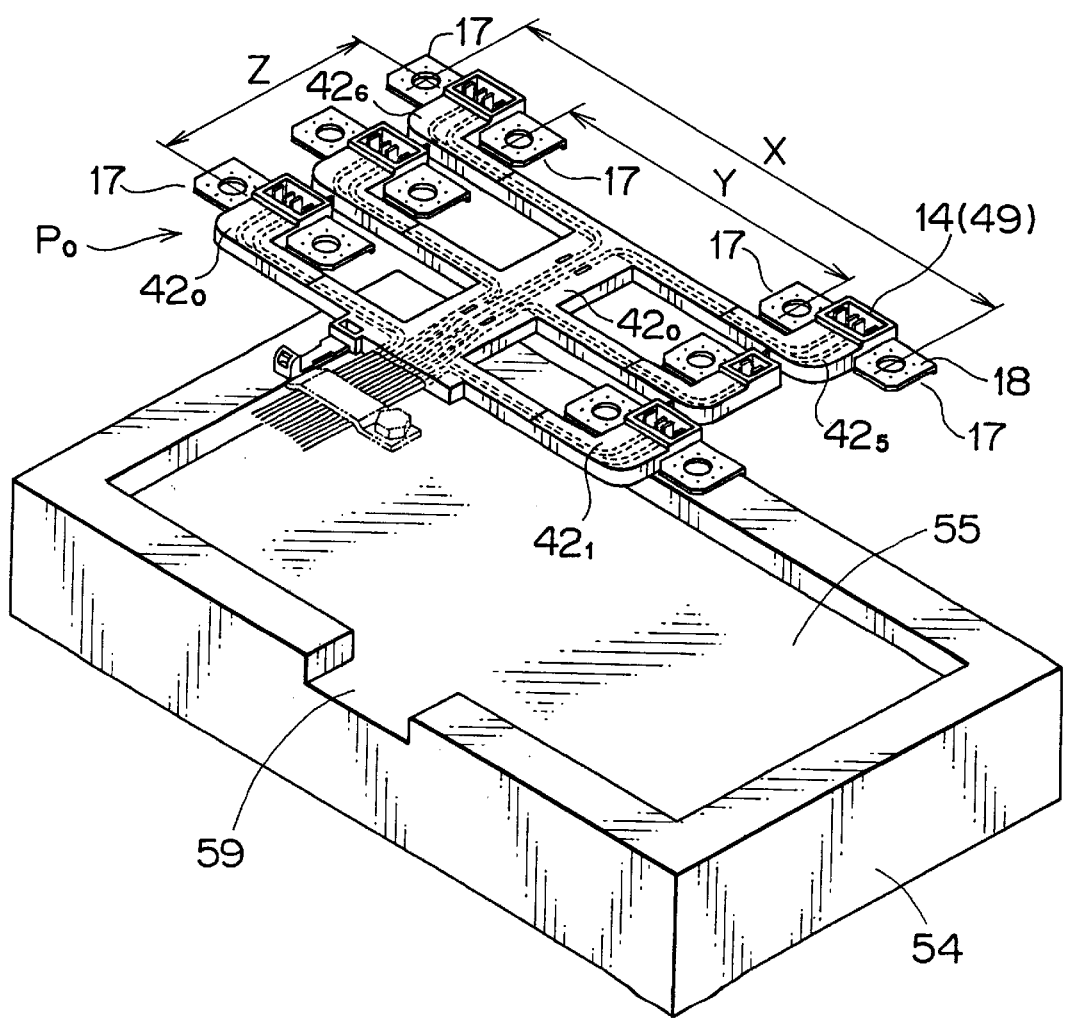
FIG. 14 is an explanatory view of the harness of FIG. 7 being subjected to insert molding.
Figure 15:
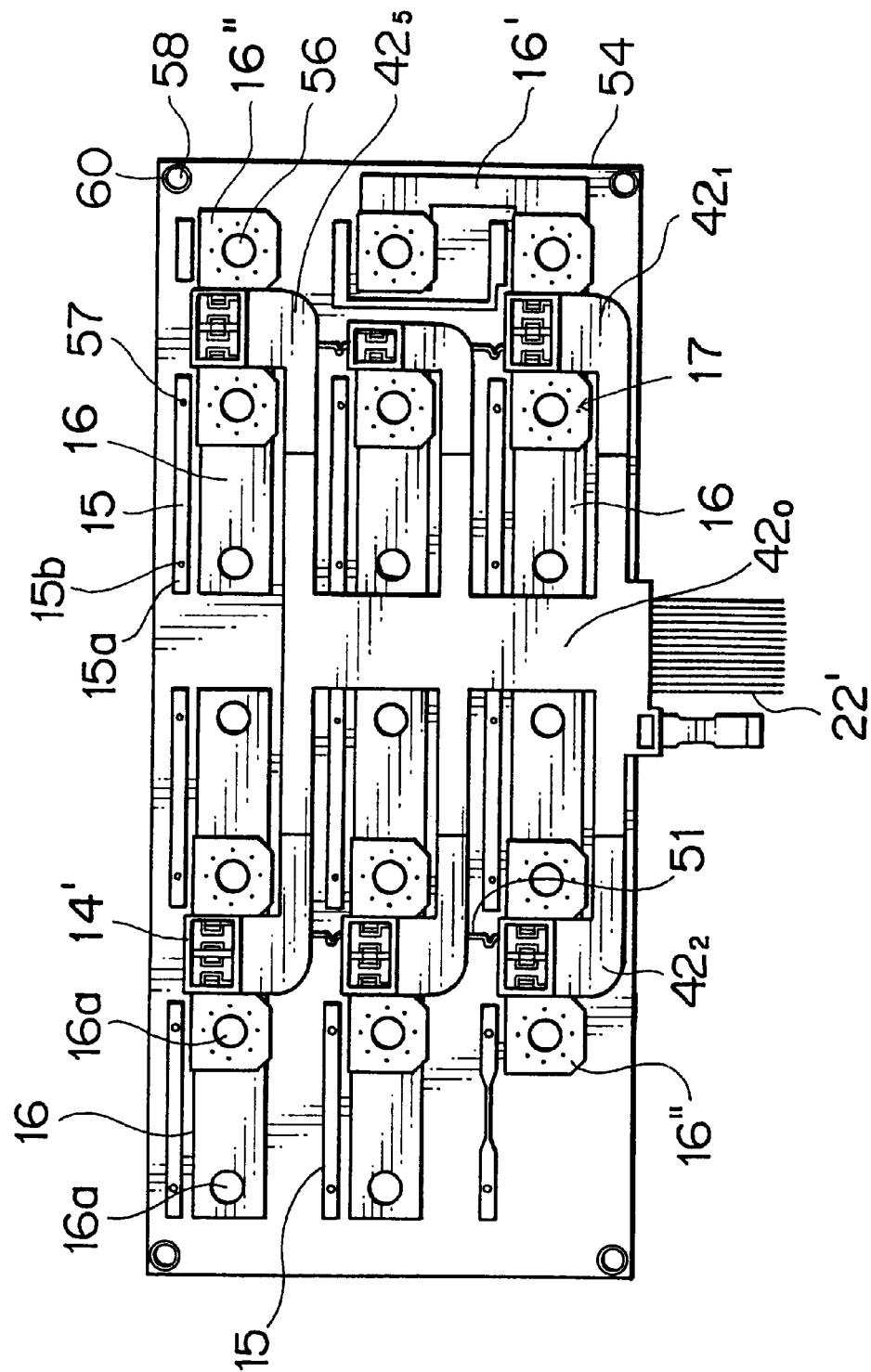
FIG. 15 is a plan view of the harness of FIG. 7 set in a mold.

The harness $P_0$, as shown in FIGS. 14 and 15, is then set in a mold for insert molding.

In other words, the lower die 54 is provided inside its cavity 55 with positioning lock pins 56, 57 for the busbars 16, 16' and the PTC element connection pieces 15, and at the four corners with collar locking pins 58. The die 54 is further provided with positioning grooves (not shown) engageable with the positioning ribs 50 of the wire protector 23. Denoted 59 is a placement recess for receiving therein the wire letting-out portion 36.

After the busbars 16, 16', 16" and the PTC element connection pieces 15 as well as the collars 60 are accurately positioned through the respective lock pins 56–58 in the cavity 55, the harness $P_0$ is set so that predetermined busbars 16 are in register with the related voltage detecting terminals 17.

The registration, as mentioned hereinabove, is easily effected by superimposing the contact portion 18 of the voltage detecting terminal 17 on the end of the set busbar 16, 16' such that its resin leakage prevention piece 18c and continuous piece 18d abut against the end edges of the busbar 16, 16' perpendicular to each other (FIG. 5).

Figure 16A:
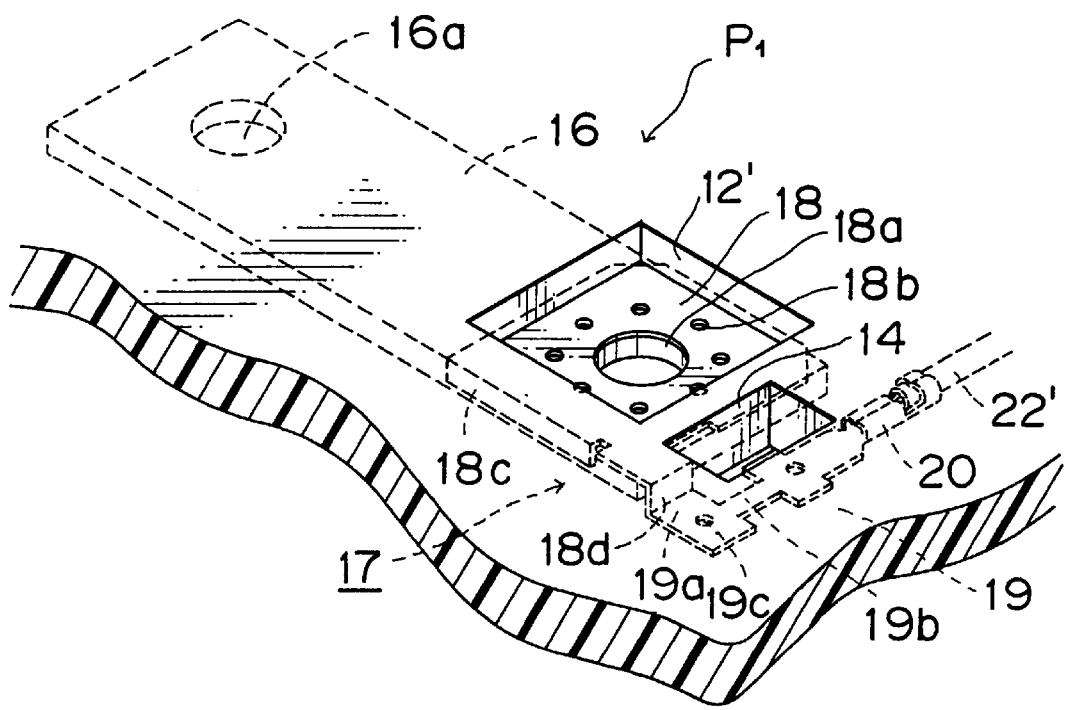
FIG. 16A is an essential portion perspective view showing the busbar and the voltage detecting terminal in a connected condition in the connecting plate after insert molded.
Figure 16B:
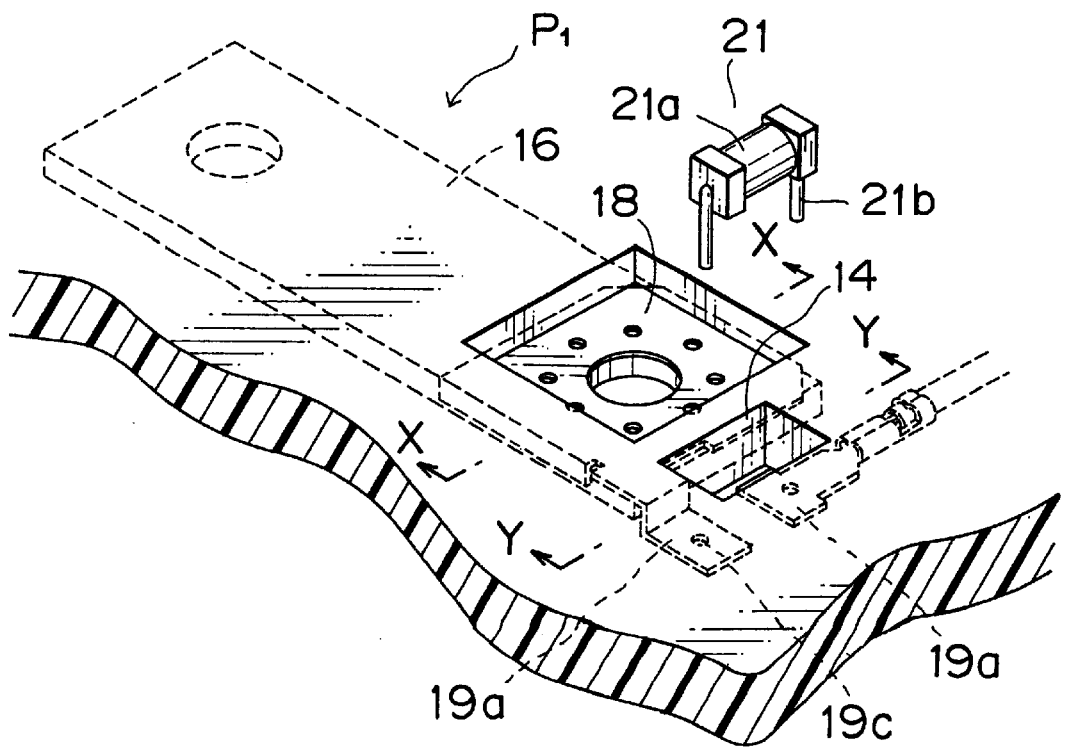
FIG. 16B is a view similar to FIG. 16A, showing the circuit protecting element (fuse) about to be mounted.

The upper die (not shown) is then set on the lower die 54, and by effecting the insert molding under predetermined conditions, a molded piece $P_1$ is obtained which is shown in FIGS. 16A and 16B.

The molded piece $P_1$ has the busbars 16, 16' for connecting the electrodes 2a, 2b of batteries A and the PTC element connection pieces 15 embedded in its molded resin plate 11. There are opened in the molded piece $P_1$ the battery-connecting hexagonal windows 12 and square windows 12 and the PTC element-connecting square windows 13, and the element mount portion 19 of the voltage detecting terminal 17 is exposed in each fuse mount window 14.

By mounting the fuse 21 in each fuse mount window 14 of the molded piece 14, the finished connecting plate 10 is obtained.

In other words, the link piece 19b as shown in FIG. 16A which connects the pair of lead connection pieces 19a, 19a at each fuse mount window 14 is cut as shown in FIG. 16B, and the leads 21b of the fuse 21 are inserted into the lead connection holes 19c of the lead connection pieces 19a and subjected to soldering to the respective lead connection pieces 19a.

The resin leakage prevention piece 18c, which is located adjacent the superimposed surfaces of the busbar 16 and the contact portion 18 and in a flow direction of molten resin, blocks the entrance of molten resin in between the superimposed surfaces during the insert molding, so that these surfaces are contacted with each other and held in that condition through the molding.

Figure 17A:
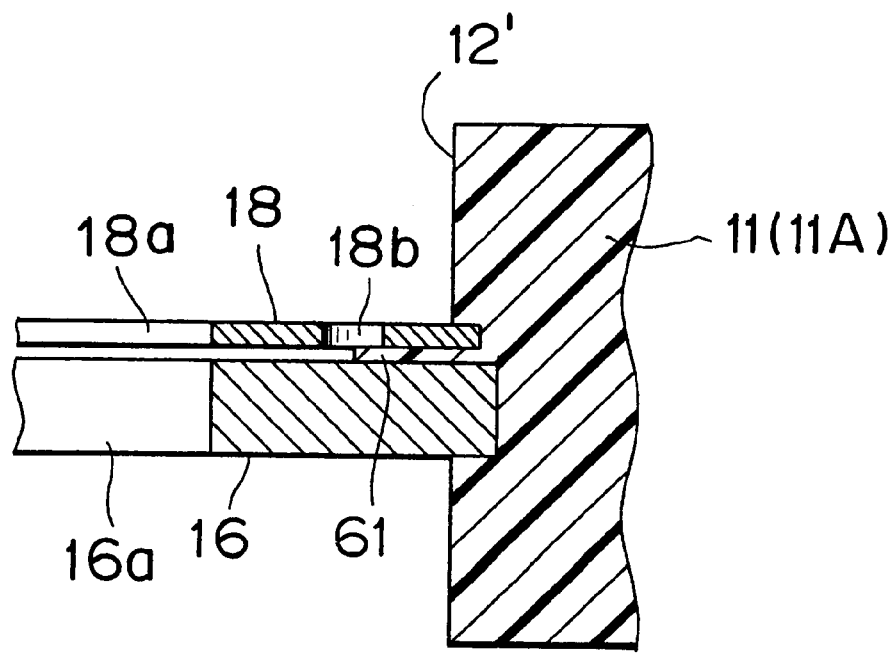
FIG. 17A is a sectional view taken along the line X—X of FIG. 16B.

As shown in FIG. 17A, if molten resin 61 leaks in between the busbar 16 and the contact portion 18, such can be easily checked through the resin leakage checking hole 18b, thereby preventing in advance defectives from being produced.

Figure 17B:
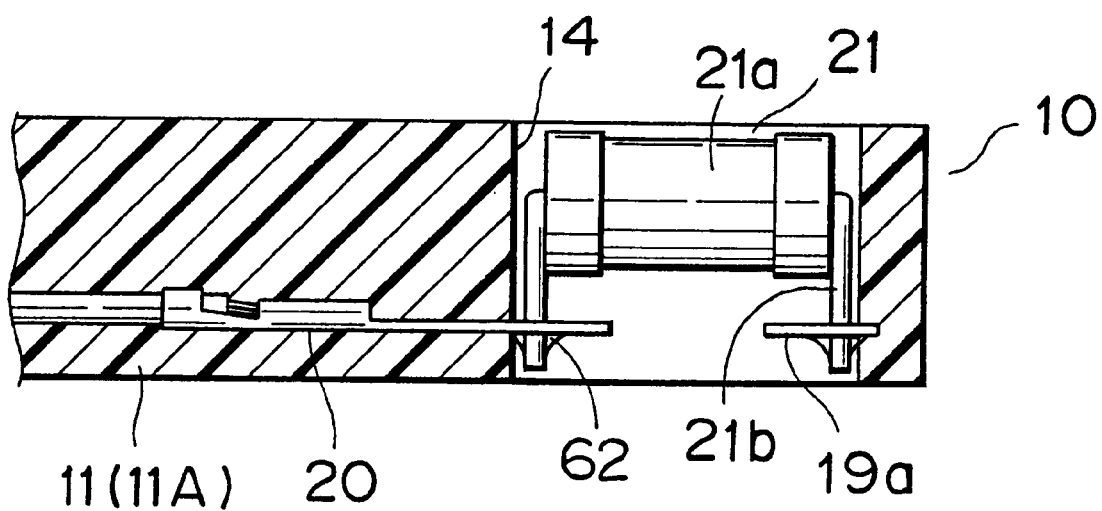
FIG. 17B is a sectional view taken along the line Y—Y of FIG. 16B, shown with the fuse connected.
Figure 18A:
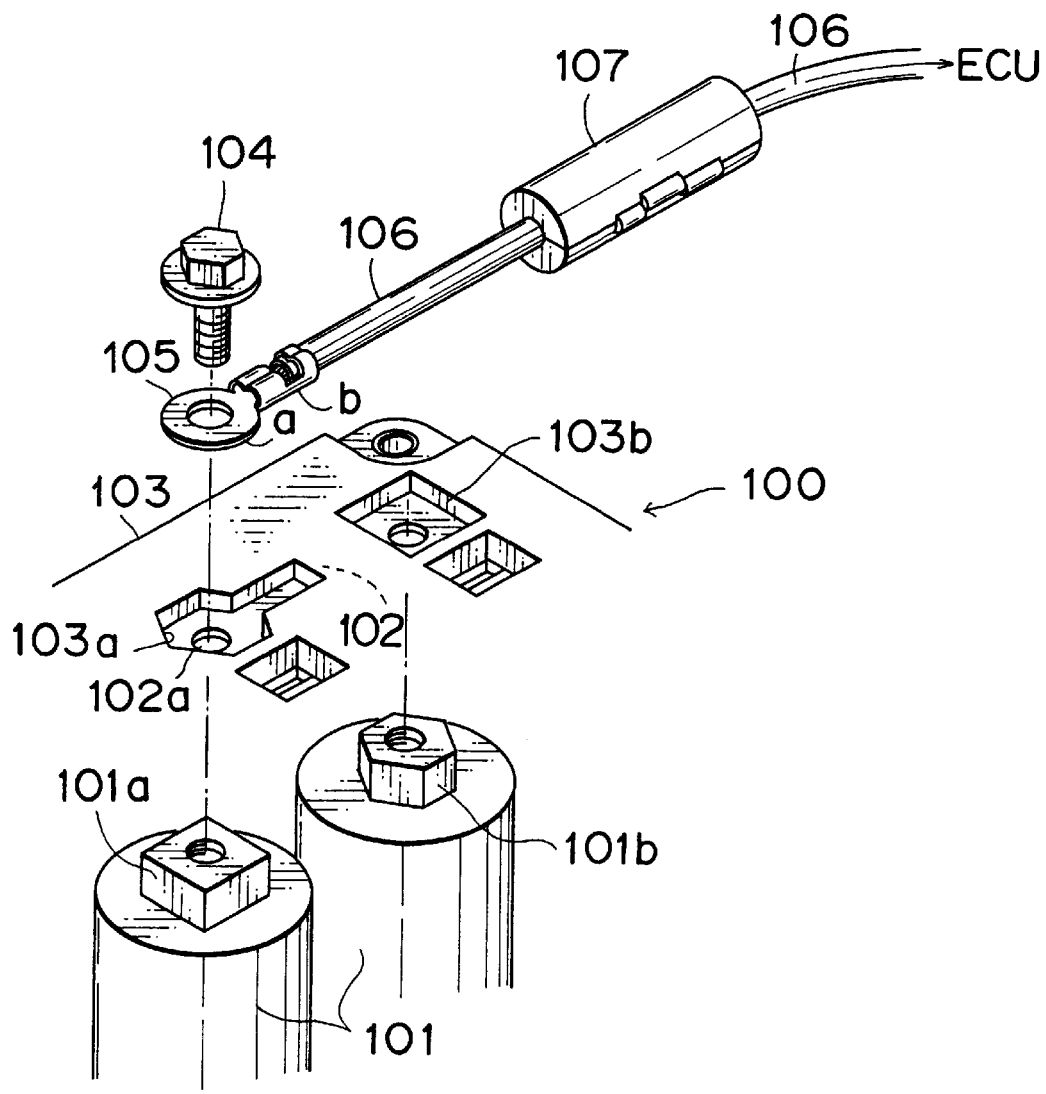
FIG. 18A is an essential portion perspective view of one example of a conventional connecting plate for a battery holder.
Figure 18B:
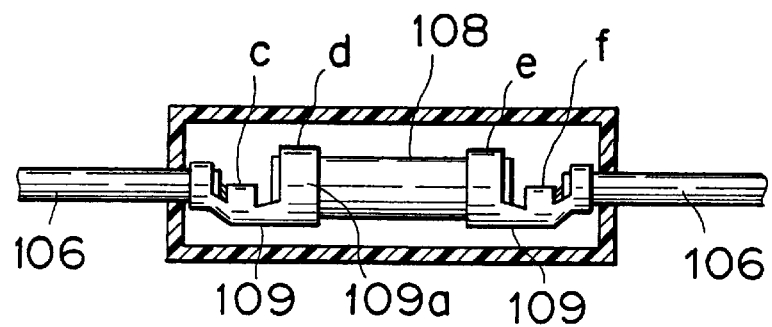
FIG. 18B is a sectional view of a fuse holder in FIG. 18A.
Figure 19:
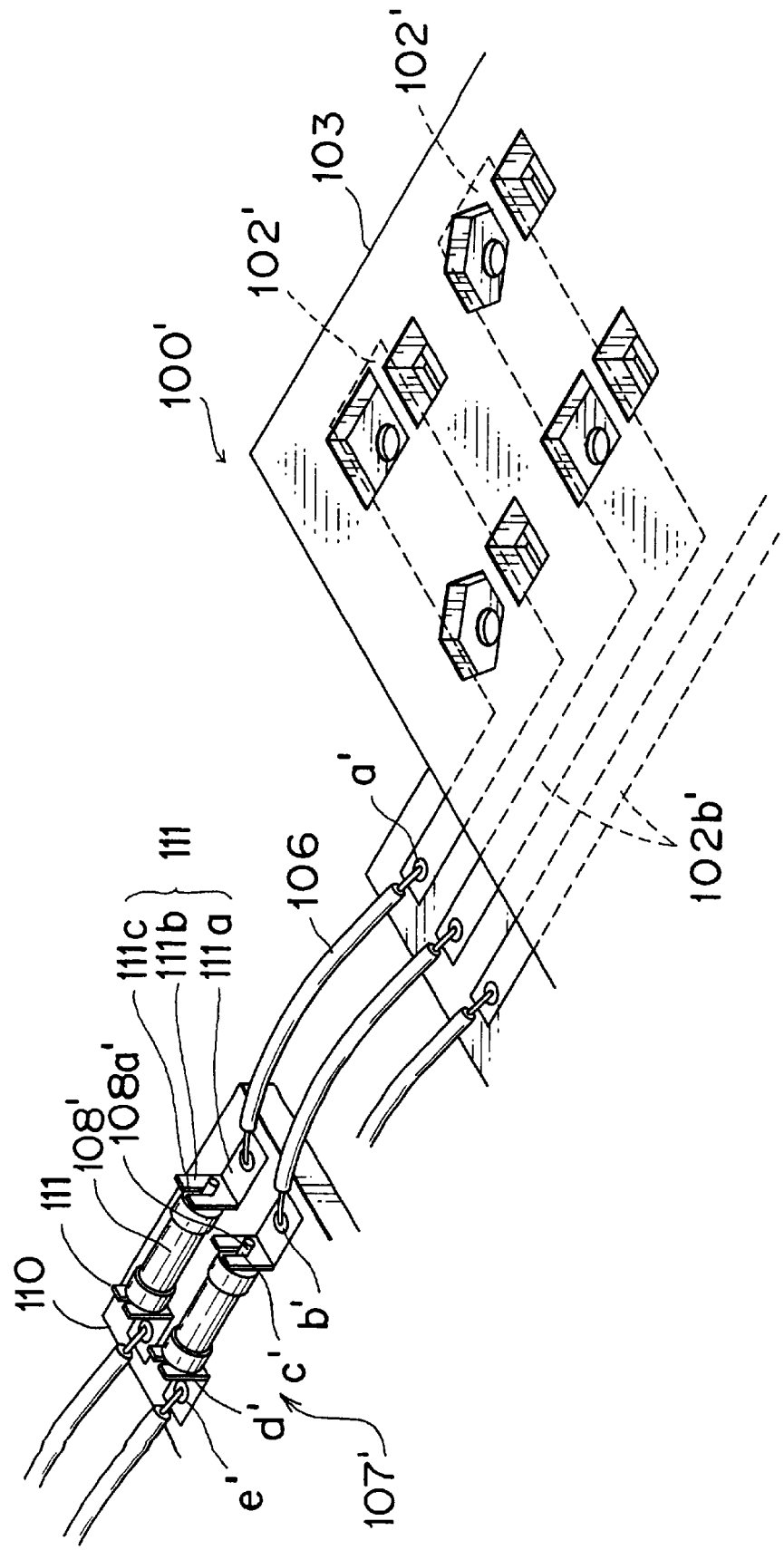
FIG. 19 is an essential portion perspective view of another conventional connecting plate for a battery holder.
Figure 20:
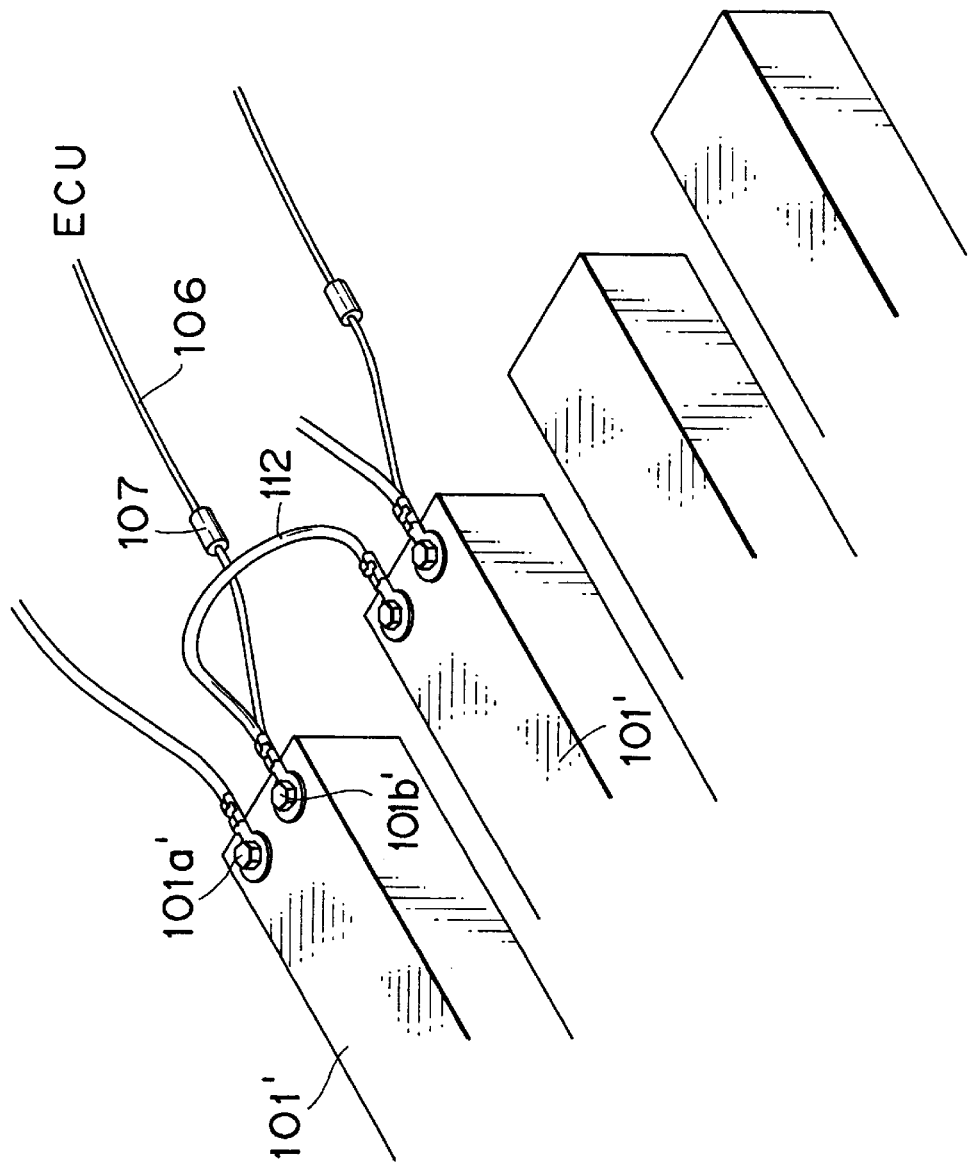
FIG. 20 is an explanatory view of another example of a conventional method of connecting batteries.

On the other hand, in case of no such resin leakage, the the link piece 19b located in the fuse mount window 14 of the molded piece $P_1$, as shown in FIG. 17B, is cut away, and the leads 21b of the fuse 21 are inserted into the respective lead connection holes 19 of the opposed lead connection pieces 19a, followed by their soldering to the lead connection pieces 19a. The finished connecting plate 10 is thus obtained.

Incidentally, the connecting plate 10' used in a pair with the connecting plate 10, which carries no voltage detecting terminals 17, may be produced by a conventional insert molding method without using the wire protector 23.

Reverting to FIG. 1, batteries A are inserted in succession into the respective battery insertion holes 5 of the battery holder B, with their positive and negative electrodes 2a, 2b reversed in an alternating manner, and then the connecting plates 10 and 10' are set on the electrodes 2a, 2b prominent at opposite ends of the holder B, followed by fastening by turns the busbars 16 (16') at their opposite ends to the respective positive and negative electrodes 2a, 2b of the batteries A with bolts 63 (FIG. 4).

The batteries $A_1, A_2, A_3 \ldots A_n$, as shown in FIG. 3A, are thus connected in series by means of the busbars 16 (16'). Because a fuse 21 is connected, via the respective voltage detecting terminal 17, to the single-pole busbar 16" and the double-pole busbar 16 at their one end, by connecting their wires 22 to the not-shown ECU, the batteries A can be monitored for voltage in pairs and can be quickly replaced in units of two batteries in case of abnormal voltage.

Further, the PTC element 3 set on each battery $A_1, A_2 \ldots A_n$ has leads (not shown) at its opposite sides which are connected to opposite ends of the related connection piece 15 located in the connecting plate 10 (10'). In other words, not-shown screws are threaded in connection holes 15b at the opposite ends 15a of the connection piece 15. The leads of the PTC element 3 as mentioned above are led out through respective passages 13a formed at a side in the square windows 13 and connected to the related connection piece 15 with the screws threaded in the connection piece 15.

The PTC elements 3 of all the batteries $A_1, A_2 \ldots A_n$, as shown in FIG. 3B, are thus connected in series. Consequently, in case of an abnormal amount of heat generated in any of the batteries A, the resistance of the PTC element 3 at that battery A increases abruptly, resulting in the interruption of the check circuit. Thus, owing to the structure as mentioned above, abnormal voltage and abnormal generation of heat in the batteries A inside the battery holder B can be constantly monitored.

In the structure above, the layout of the busbars 16, 16' in the connecting plate 10 is determined by the number and positions of the battery insertion holes 5 provided in the support plates 6 of the battery holder B as shown in FIG. 1. The dimension between voltage detecting terminals 17, 17 also requires a high degree of accuracy.

In other words, in the connecting plate 10, as shown in FIG. 14 with the harness $P_0$ used as a substitute for the connecting plate 10, the dimension X between the outer, remote voltage detecting terminals 17, 17, the dimension Y between the inner terminals 17, 17, the dimension Z between the vertically spaced terminals 17, 17 require a high degree of precision, and it is difficult to effect the insert molding in one step, with the dimensions between neighboring and remote ones of the large number of busbars 16, 16' and wire-attached voltage detecting terminals 17 maintained to a given degree of accuracy.

According to this invention, however, the insert molding and the dimension control are made easy by the harness $P_0$ employing the wire protector 23.

In other words, at the time of insert molding as shown in FIGS. 14 and 15, the busbars 16 are in advance accurately positioned through the lock pins 56 inside the die 54. Accordingly, by setting the harness $P_0$ from thereabove, the voltage detecting terminals 17 can be accurately placed in position by one operation. The harness $P_0$, which has the positional deviation absorbing portion 27 in each branch receiver 26 and the hinge 51 between neighboring terminal holders 32, 32, is easily lengthwise and crosswise bendable, with the voltage detecting terminals 17 being fixedly maintained in their respective terminal holders 32, so as to be set with ease. In this instance, because the connection wires 22 are protected in the wire protector 23, they do not get tangled with one another, nor the voltage detecting terminals 17 are caused to get out of position.

Figure 22:
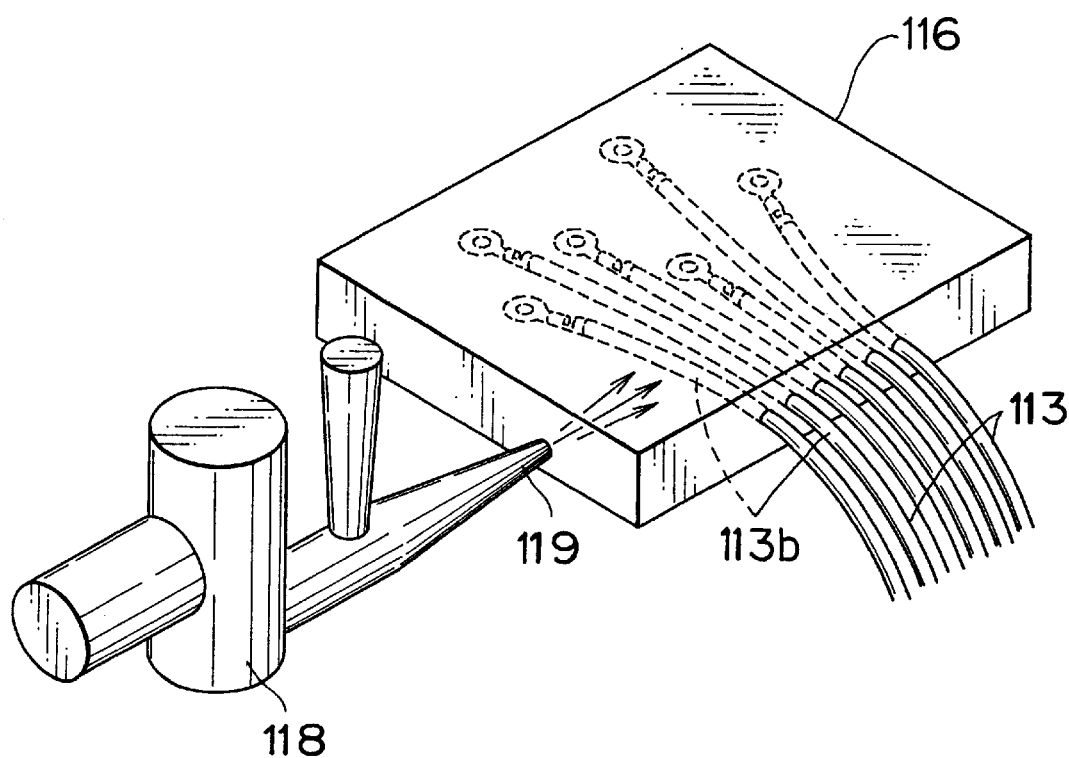
FIG. 22 is an explanatory view of a conventional method of injecting resin into a mold.

The connection wires 22 of the voltage detecting terminals 17, as mentioned above, are received and protected in the wire protector 23, and thus, unlike the related art as shown in FIG. 22, do not directly come into contact with high-temperature molten resin during the insert molding. Therefore, no heat-resistant wires such as polyimide-covered wires are required.

Figure 21A:
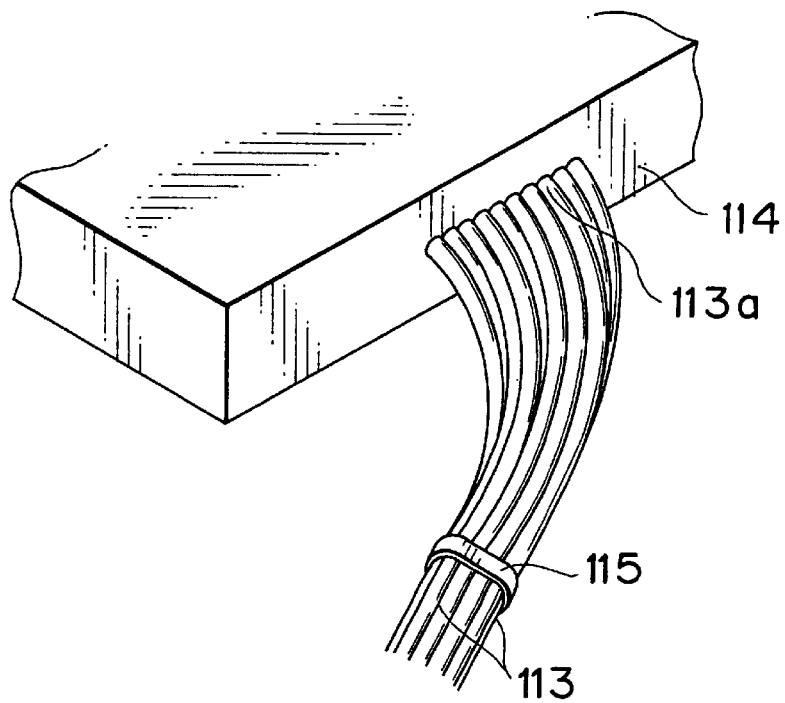
FIG. 21A is an explanatory view of a conventional fixing structure of wires by a molded resin plate.
Figure 21B:
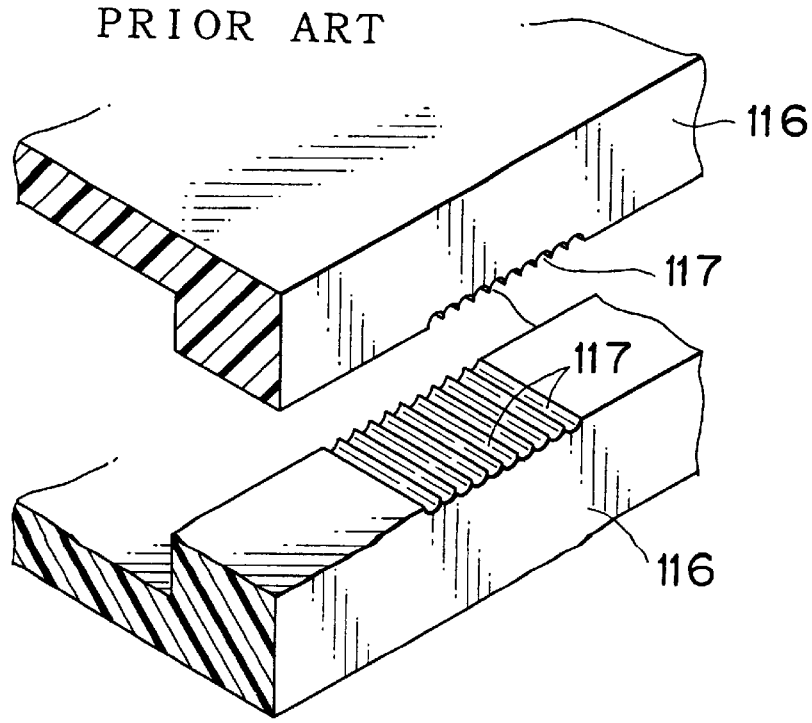
FIG. 21B is an explanatory view of upper and lower dies for the conventional fixing structure of FIG. 21A.

The connection wires 22 of the voltage detecting terminals 17 are held in an orderly manner in the wire letting-out portion 36 of the wire protector 23, and further bundled and fixed in position by the wire holding band 39. Therefore, in the stage of the harness $P_0$, during the insert molding and in the stage of the finished connecting plate 10, the concentration of stress or biting by the upper and lower dies as explained in connection with FIGS. 21A and 21B are precluded.

In the connecting plate 10 of this invention, as will be apparent from a comparison of FIGS. 16A and 16B, the lead connection pieces 19a, 19a of the element mount portion 19 to which the leads 21b of the fuse 21 are connected, are initially linked by the link piece 19b. Therefore, during preparation of the harness $P_0$ and at the time of insert molding, the parts of the contact portion 18, element mount portion 19 and wire connecting portion 20 can be handled as a single unit or voltage detecting terminal 17. A reduction is thus made in the number of parts and man-hours, leading to a cost reduction.

Having now fully described the invention, it will be apparent to one of ordinary skill in the art that many changes and modifications can be made thereto without departing from the spirit and scope of the invention as set forth herein.

What is claimed is:

1. A battery-connecting plate comprising:

busbars for connecting batteries together; and a wire protector which holds in a predetermined layout therein terminals and their connection wires for detecting voltage of desired ones of said batteries, said busbars and said wire protector being fixed in a resin plate by insert molding, with said busbars arranged in correspondence with said batteries and with said terminals held in contact with related ones of said busbars.

2. The battery-connecting plate according to claim 1, wherein said terminals each comprises a contact portion superimposed on said respective busbar, a wire connecting portion at which connected to said respective connection wire, and an element mount portion linking said contact portion and said wire connecting portion, and further comprising circuit protector elements which are, after completion of said insert molding, connected to said respective element mount portions of said terminals.

3. The battery-connecting plate according to claim 2, wherein said connection wires connected to said respective terminals are let out of said resin plate at one side thereof.

* * * * *